(12) United States Patent
Sampson et al.

(10) Patent No.: US 11,529,859 B2
(45) Date of Patent: Dec. 20, 2022

(54) ELECTRIC VEHICLE BATTERY MANAGEMENT

(71) Applicant: Faraday & Future Inc., Gardena, CA (US)

(72) Inventors: Nicholas John Sampson, Rancho Palos Verdes, CA (US); Anil Paryani, Cerritos, CA (US); Daniel Arnold Sufrin-Disler, Whittier, CA (US); Kameron Fraige Saad Buckhout, Sr., Richmond, CA (US); John Henry Harris, III, San Gabriel, CA (US)

(73) Assignee: Faraday & Future Inc., Gardena, CA (US)

( * ) Notice: Subject to any disclaimer, the term of this patent is extended or adjusted under 35 U.S.C. 154(b) by 427 days.

(21) Appl. No.: 16/090,567

(22) PCT Filed: Mar. 31, 2017

(86) PCT No.: PCT/US2017/025636
§ 371 (c)(1),
(2) Date: Oct. 1, 2018

(87) PCT Pub. No.: WO2017/173420
PCT Pub. Date: Oct. 5, 2017

(65) Prior Publication Data
US 2021/0094441 A1    Apr. 1, 2021

Related U.S. Application Data

(60) Provisional application No. 62/338,958, filed on May 19, 2016, provisional application No. 62/338,973, (Continued)

(51) Int. Cl.
*H02P 1/00* (2006.01)
*B60K 1/02* (2006.01)
(Continued)

(52) U.S. Cl.
CPC .................. *B60K 1/02* (2013.01); *B60K 1/04* (2013.01); *B60K 11/02* (2013.01); *B60L 50/64* (2019.02);
(Continued)

(58) Field of Classification Search
CPC ............. G05B 11/00; H02P 1/00; B60K 1/02; B60K 1/04; B60K 11/02; B60K 2001/005;
(Continued)

(56) References Cited

U.S. PATENT DOCUMENTS

2007/0116135 A1 * 5/2007 Tsuchida ............. H04L 25/4902
375/259
2011/0133694 A1    6/2011 Song
(Continued)

FOREIGN PATENT DOCUMENTS

| JP | 2014-045631 A | 3/2014 |
| JP | 2015-095971 A | 5/2015 |
| WO | WO-2021087343 A1 * | 5/2021 |

OTHER PUBLICATIONS

International Search Report dated Aug. 8, 2017 for International Application No. PCT/US2017/025636.

*Primary Examiner* — Karen Masih
(74) *Attorney, Agent, or Firm* — Knobbe Martens Olson & Bear LLP

(57) ABSTRACT

Disclosed herein are electric vehicles with various characteristics. For example, electric vehicles with at least two energy storage systems are described. As another example, electric vehicles with liquid temperature regulated battery packs are described. As yet another example, electric vehicles with high voltage battery limit optimization are disclosed. And, as another example, electric vehicles with dual-battery system charge management are described.

20 Claims, 22 Drawing Sheets

Related U.S. Application Data filed on May 19, 2016, provisional application No. 62/317,157, filed on Apr. 1, 2016, provisional application No. 62/317,137, filed on Apr. 1, 2016.

(51) Int. Cl.

| | |
|---|---|
| *B60L 50/64* | (2019.01) |
| *B60L 53/80* | (2019.01) |
| *B60L 58/18* | (2019.01) |
| *B60K 1/04* | (2019.01) |
| *B60K 11/02* | (2006.01) |
| *H01M 10/44* | (2006.01) |
| *B60K 1/00* | (2006.01) |

(52) U.S. Cl.
CPC ............... *B60L 53/80* (2019.02); *B60L 58/18* (2019.02); *H01M 10/44* (2013.01); *B60K 2001/005* (2013.01); *B60L 2210/10* (2013.01); *B60Y 2410/10* (2013.01)

(58) Field of Classification Search
CPC ...... B60L 58/18; B60L 50/64; B60L 2210/10; B60Y 2410/10; H01M 10/44
See application file for complete search history.

(56) References Cited

U.S. PATENT DOCUMENTS

| | | |
|---|---|---|
| 2014/0049206 A1 | 2/2014 | Sridhar et al. |
| 2015/0367747 A1 | 12/2015 | Decker et al. |
| 2021/0391622 A1* | 12/2021 | Froelich .............. H01M 50/204 |

* cited by examiner

ELECTRIC VEHICLE BATTERY MANAGEMENT

CROSS-REFERENCE TO RELATED APPLICATIONS

The present application is a National Phase application under 35 U.S.C. 371 of International Application No. PCT/US2017/025636, filed Mar. 31, 2017, which claims the benefit of U.S. Provisional Application No. 62/317,157, filed on Apr. 1, 2016, entitled "ELECTRIC VEHICLE WITH AT LEAST TWO ENERGY STORAGE SYSTEMS," U.S. Provisional Application No. 62/317,137, filed on Apr. 1, 2016, entitled "LIQUID TEMPERATURE REGULATED BATTERY PACK FOR ELECTRIC VEHICLES," U.S. Provisional Application No. 62/338,958, filed on May 19, 2016, entitled "ELECTRIC VEHICLE HIGH VOLTAGE BATTERY LIMIT OPTIMIZATION," and U.S. Provisional Application No. 62/338,973, filed on May 19, 2016, entitled "ELECTRIC VEHICLE DUAL-BATTERY SYSTEM CHARGE MANAGEMENT." The content of each of the above-referenced applications is hereby incorporated by reference herein in its entirety and for all purposes.

BACKGROUND

The present disclosure relates to energy storage systems for electric vehicles.

BRIEF DESCRIPTION OF THE DRAWINGS

The following is a brief description of each drawing. From figure to figure, the same reference numerals have been used to designate the same components of an illustrated embodiment. The drawings disclose illustrative embodiments and particularly an illustrative implementation in the context of an electric vehicle. They do not set forth all embodiments. Other embodiments may be used in addition to or instead. Conversely, some embodiments may be practiced without all of the details that are disclosed. It is to be noted that the figures provided herein may not be drawn to any particular proportion or scale.

DETAILED DESCRIPTION

Figure 1:
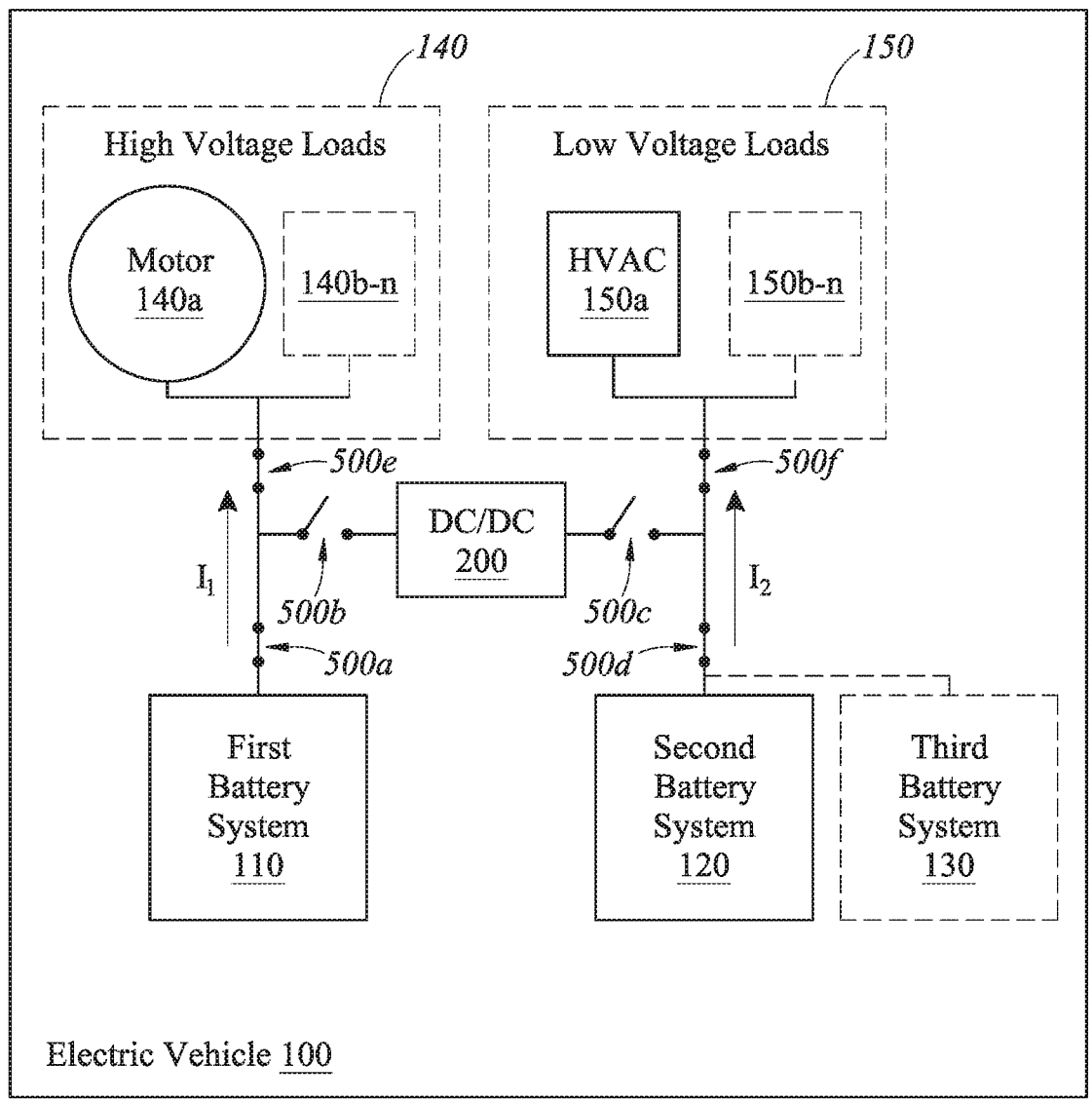
FIG. 1 is a schematic illustration of an electric vehicle having two battery systems according to an exemplary implementation. As shown, the first battery system powers one or more high voltage loads and the second battery system powers one or more low voltage loads.

Electric Vehicle with at Least Two Energy Storage Systems

Internal combustion engine vehicles generally contain a battery to provide power for starting the vehicle and for powering headlights, the radio, and other electrical power consuming systems when the engine itself is not running. Such batteries are typically lead-acid batteries with a nominal 12 V output. When the internal combustion engine is running, an alternator driven by the internal combustion engine is connected across the battery, continuously charging the battery and providing the current to the vehicle electrical systems that are in use while the vehicle is being driven or is idling with the engine running.

In an electric vehicle, a first battery system having a relatively high voltage output (e.g. nominal 300 V) powers one or more electric motors that drive the vehicle wheels. Such electric vehicles also typically have a second battery system with a lower output voltage (e.g. nominal 12 V) than the first battery system. The second battery system is connected to other electrically powered vehicle systems such as the cabin HVAC system, interior and/or exterior lights, and the like. When the first battery system is coupled to the motor(s) for vehicle travel, a step down DC/DC converter with an input connected to the first battery system has an output that continuously charges the second battery system and provides power to the non-motor electrical power consuming systems of the vehicle with current from the first battery system.

The devices, systems, and methods disclosed herein have several features, no single one of which is solely responsible for its desirable attributes.

In some implementations the electric vehicles disclosed herein include at least two separate energy storage systems. The systems may have a relatively high energy capacity as compared to previous electric vehicles. One energy storage system may be used to power high voltage loads, and one energy storage system may be used to power low voltage loads. In this way, the need to use a DC-DC convertor may be reduced or eliminated. The energy storage systems may be independently charged and/or discharged. In some aspects, a first battery system may be used to power the electric motors that propel the vehicle while a second battery system can be used to power the cabin's heating, ventilation, and air conditioning ("HVAC").

In some implementations, an electric vehicle includes a first battery and at least one electric motor capable of propelling the vehicle. The motor may be powered by the first battery in a charge depleting manner. The electric vehicle may also include a second battery that is physically separate from the first battery and an HVAC system. The HVAC system may be powered by the second battery in a charge depleting manner during at least some time periods when the first battery is powering the motor. The first battery and the second battery may be coupled through at least one DC-DC convertor. The second battery may have a terminal voltage that is less than a terminal voltage of the first battery. The first battery may be capable of charging the second battery through at least one DC-DC convertor. The second battery may be capable of charging the first battery through at least one DC-DC convertor. The DC-DC convertor may not operate during at least some time periods when the first battery is powering the motor. The electric vehicle may include a charge port. The charge port may be capable of electrically coupling to a charging station. The charge port may have a direct electrical connection with the first battery and a direct electrical connection with the second battery.

In some implementations, a method of powering an electric vehicle, while the vehicle is traveling, includes one or more of the following steps. The method may include discharging a first battery system by drawing current from the first battery system to power one or more motor loads and simultaneously discharging a second battery system by drawing current from the second battery system to power at least one non-motor load. The second battery system may be electrically isolated from the first battery system. Current from the first battery system may not be used to recharge the second battery system. Current from the second battery system may not be used to recharge the first battery system. Discharging the second battery may include discharging the second battery system such until a terminal voltage of the second battery system is less than 80% of a terminal voltage of the second battery system when the second battery system is in a fully charged state. In some aspects, discharging the second battery system includes discharging the second battery system by at least 50% of the energy storage capacity of the second battery system. Non-motor loads may include cabin HVAC loads, infotainment loads, and external light loads. In some aspects, HVAC unit loads include a resistive heater, a fan, and/or a compressor.

In some implementations, a method of charging an electric vehicle having at least two energy stores that are coupled together by a DC-DC convertor includes one or more of the following steps: receiving current from a charging connection coupled to the electric vehicle, routing a first current directly to a first battery, and routing a second current directly to a second battery that is physically separated from the first battery. In some aspects, no current is routed through the DC-DC convertor during at least some of the charging process.

Electric vehicles having at least two separate energy storage systems are disclosed herein. The first battery system may be configured to power the vehicle's drivetrain. The second battery system may be configured to power one or more other components of the vehicle. In some aspects, the first battery system is a high voltage battery system and the second battery system is a low-voltage battery system. That is to say, the low-voltage battery system may have a terminal voltage that is less than the terminal voltage of the first battery system. Both battery systems may have a relatively high charge storage capacity. That is to say, both battery systems may store large amounts of energy (1-300 kilowatt hours). In this way, the performance and range of the vehicle can be improved as will be explained below.

Typical electric vehicles almost exclusively draw their power from one high capacity, high voltage battery system. The high capacity, high voltage battery system is used to power the motors that propel the vehicle and is stepped down with one or more DC-DC convertors to power other electrically powered systems. When the high capacity, high voltage battery system is not engaged, for example, when the vehicle is parked, a lower capacity, lower voltage battery may be relied upon. This second battery may function as a typical automobile battery and may be used to start the vehicle and power other components such as, for example, the windows, door locks, and stereo when the high capacity, high voltage battery is disengaged. The second battery is typically recharged by the high capacity, high voltage battery when the vehicle is driving and/or when the high voltage battery system is engaged.

The high voltage battery system may be configured to power the vehicle components that require relatively high voltages. For example, the high voltage battery system may be configured to power one or more electric motors that are used to propel the vehicle. The low voltage battery system may be configured to power the vehicle components that require relatively lower voltages in comparison to the high voltage battery system. For example, the low voltage battery system may be configured to power the cabin HVAC system(s), the windows, the locks, the doors, the audio and entertainment systems, infotainment systems, wireless modems and routers, touch screens, displays, navigation systems, automated driving systems, and the like. Low voltage systems or components may generally refer to systems or components that require less voltage than the motors that propel the vehicle.

A vehicle with at least two separate high capacity energy storage systems can have several advantages. For one, the low voltage system can power vehicle systems for long periods of time without engaging the high voltage battery system. Energy is lost when electric power is moved between battery systems. For example, DC-DC converters are not perfectly efficient and energy is lost when a DC-DC convertor is operated. Thus, if the low voltage system has sufficient storage capabilities, it can be used to power systems other than the propulsion motors for longer periods of time and the need for recharging the low voltage system and/or the need to draw power from the high voltage system, may be reduced or eliminated.

In some implementations, the electric vehicle is configured such that both the high voltage battery system and a low-voltage battery system run in a charge depletion mode for at least a portion of a trip. This reduces or eliminates the need for the re-charging of the low voltage battery system by the high voltage battery system and reduces energy lost through a DC-DC convertor.

In addition, apparent power losses from, for example, accelerating while running the HVAC system(s) can be reduced or eliminated. A single high voltage, high capacity battery system may be over taxed when a large amount of current is required. Thus, in some implementations, a first battery system may power the one or more electric motors for propelling the vehicle, while a second battery system can be used to power the HVAC. This may allow for more consistent and predictable loads on each separate battery system. In addition, the reduction and/or elimination of the use DC-DC convertor may increase the vehicle's driving range.

Energy losses during vehicle recharging may also be eliminated or reduced. Typically, an electric vehicle is recharged by coupling to a battery charging station. The high voltage system is charged and then the low voltage battery is charged by transferring power from the high voltage system through a DC-DC convertor to the low voltage system. Energy may be lost through the DC-DC convertor. Thus, in some implementations, the vehicle and charging station may be configured such that the at least two separate battery systems are independently charged—eliminating the need for a DC-DC convertor. Thus, according to some implementations, a charge port may be coupled directly to the high voltage battery and directly coupled to the low voltage battery such that current does not flow through a DC-DC convertor. Accordingly, both battery systems may be separately and independently charged to increase charging efficiency and reduce energy losses.

A high capacity, low voltage battery may also allow for more systems to operate and/or remain operational for long periods of time without the need for drawing power from the high voltage system. For example, in hot or cold weather, it may be desirable to cool or heat the vehicle's passenger cabin prior to the vehicle's use. The high capacity, low voltage battery may be used to power the car's HVAC system without engaging the high voltage system, thus eliminating the need for a DC-DC convertor, and increasing the overall efficiency. A high capacity, low voltage battery may also be able to start and/or operate in very low temperatures. Thus, the need for heating the low voltage battery system may be eliminated. A high capacity, low voltage battery may also allow the vehicle to be coupled to the internet or other network, power on board refrigerators, phones, television, audio systems, tire inflation devices, and the like, for long periods of time without accessing the power from the high voltage battery systems.

The effective battery life of both of the battery systems may be increased by having two high capacity systems. That is to say, having two high capacity batteries reduces and/or eliminates the need to transfer power from the high voltage system to the low voltage system (and vice versa), reduces battery cycling (recharging), and increases the effective life of the battery systems.

Two separate battery systems may also allow for a better distribution of weight throughout the vehicle. Similarly, two separate battery systems may also allow for more efficient use of space within the vehicle. In some aspects, the first battery system may be positioned in the front of the car (e.g. in the hood area) and the second battery system may be in the rear of the car (e.g. in the trunk area). In some aspects, the first battery system may be positioned in the underside of the car and the second battery system may be positioned in the front of the car (e.g. in the hood area). The first and/or second battery system may be cooled by a liquid cooling system.

The following description is directed to certain implementations for the purpose of describing the innovative aspects of this disclosure. However, a person having ordinary skill in the art will readily recognize that the teachings herein can be applied in a multitude of different ways.

As used herein, the term "electric vehicle" can refer to any vehicle that is partly or entirely operated based on stored electric power, such as a pure electric vehicle, plug-in hybrid electric vehicle, or the like. Such vehicles can include, for example, road vehicles (cars, trucks, motorcycles, buses, etc.), rail vehicles, wheeled robots, or the like.

In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Reference may be made throughout the specification to a "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as "low voltage" systems. Some vehicles may use two or more 12 volt batteries to provide higher voltages. Thus, it will be clear that the systems and methods described herein may be utilized with low voltage battery arrangements in at least the range of 4-52 volts without departing from the spirit or scope of the systems and methods disclosed herein.

In some aspects, the second high capacity battery system is added to an existing electric vehicle. For example, the second high capacity battery system can be provided as an add-on package or kit for increasing the capacity of a low voltage battery systems that already exists.

The battery systems disclosed herein may include a plurality of electrochemical cells. The cells may be connected in series and/or in parallel. The cells may be divided into multiple portions or strings. The batteries and/or strings of batteries may be connected to or isolated from other vehicle circuitry by one or more magnetic contactors. Normally open contactors may require a power supply in order to enter or remain in the closed circuit position. Such contactors may be configured to be in the open (disconnected) configuration when powered off to allow the batteries and/or strings of batteries to remain disconnected while the vehicle is powered off. Thus, on startup, a small power input may be required to close at least one contactor of the batteries, battery packs, and/or strings of batteries. Once a contactor is closed, the batteries may supply the power required to keep the contactor(s) closed and/or supply power to other vehicle systems.

Turning now to FIG. 1, an electric vehicle 100 having two battery systems is schematically illustrated. As shown, a first battery system 110 may be electrically connected to one or more high voltage loads 140. The first battery system 110 may include one or more batteries connected in series and/or in parallel. The first battery system 110 may be controlled by one or more battery controllers or battery control systems (not shown). Such controllers may include circuitry capable of regulating and/or controlling the available voltage differences and/or current.

The one or more high voltage loads 140 may include an electric motor 140*a*. The electric motor 140*a* may be configured to propel the vehicle 100. The electric motor 140*a* may be an interior permanent magnet motor. One or more inverters may be also be provided. It should be appreciated that while the motor 140*a* is an electrical machine that can receive electrical power to produce mechanical power, it can also be used such that it receives mechanical power which it converts to electrical power. Additional loads 140*b-n* may also be electrically connected to the first battery system 110. The additional loads 140*b-n* may include, for example, additional motors, power train components, and the like.

As shown in FIG. 1, current $I_1$ from the first battery system 110 may flow to the one or more high voltage loads 140. That is to say, the first battery system 110 may power the one or more high voltage loads 140*a-n*. A switch 500*b* in the open position is shown between the first battery system 110 and a DC/DC convertor 200. Thus, current $I_1$ does not flow from the first battery system 110 to the one or more low voltage loads 150*a-n* nor to a second battery system 120.

The second battery system 120 may be electrically connected to one or more low voltage loads 150. The second battery system 120 may include one or more batteries connected in series and/or in parallel. The second battery system 120 may be controlled by one or more battery controllers (not shown).

The one or more low voltage loads 150 may include an HVAC 150*a*. The HVAC 150*a* may be configured to heat, cool, and/or circulate air through the vehicle's passenger cabin. The HVAC 150*a* may include various types of heating, cooling, and ventilation components. For example, the HVAC 150*a* may include one or more heating elements, seat heaters, floor heaters, defrosters, deicers, fans, filters, air conditioners, compressors, and the like.

Additional loads 150*b-n* may also be electrically connected to the second battery system 120. The additional loads 150*b-n* may include, for example, additional motors (e.g. for windows, door locks, sun roofs, compartments), audio system components, infotainment system components, computers, navigation system components, mobile phones, electrical outlets, refrigerators, and the like. A battery management system (not shown) may also be used to regulate the voltage/current that is supplied to the one or more low voltage loads 150*a-n*.

As shown in FIG. 1, current $I_2$ from the second battery system 120 may flow to the one or more low voltage loads 150*a-n*. That is to say, the second battery system 120 may power the one or more low voltage loads 150*a-n*. A switch 500*c* in the open position is shown between the second battery system 120 and the DC/DC convertor 200. Thus, current 2 does not flow from the second battery system 120 to the one or more high voltage loads 140*a-n* nor to the first battery system 110. While switches 500*a-e* are shown in FIG. 1, other control mechanisms may be used. Current controllers and/or battery controllers and/or DC-DC convertor controllers may be utilized to control which battery system(s) is(are) utilized. The DC-DC convertor 200 may be a bidirectional DC-DC convertor.

In the configuration of FIG. 1, it may not be necessary to ever engage the DC-DC convertor 200 while operating the vehicle during traveling. The first and second battery systems 110, 120 may have significant enough capacity to independently power the high voltage and low voltage loads during a trip of at least 300 miles, or at least 200 miles, or at least 100 miles.

It also may not be necessary to engage the DC-DC convertor 200 during recharging. For example, a charging connection may couple to a charge port on the vehicle. The charge port may be directly connected to the first battery system and directly connected to the second battery system. Thus, energy losses from the DC-DC convertor may be avoided.

During at least a portion of the driving time of the vehicle, the first battery system 110 can power the high voltage loads 140*a-n* and the second battery system 120 can power the low voltage loads 150*a-n*. Thus, charge is depleted from both battery systems 110, 120 at the same time. In some aspects, the charge is substantially depleted from both battery systems 110, 120. In some implementations, at least 90%, at least 80%, at least 70%, at least 60%, at least 50%, at least 40%, at least 30%, at least 20%, at least 10% of the total capacity of the first and/or second battery system 110, 120 is depleted. Both battery systems are thus allowed to drain without one battery system being used to charge the other battery system.

In some aspects, the first and second battery systems 110, 120 have a relatively high capacity. Such a capacity may range from about 1-300 kilowatt hours (kWh). The first battery system 110 may be a high voltage battery system with a capacity of between about 100-200 kWh. In some implementations, the first battery system 110 has a capacity of about 120 kWh. The second battery system 120 may be a low voltage battery system with a capacity of between about 10-20 kWh. For example, the second battery system 120 may have a capacity of at least one (kWh), at least two kWh, at least three kWh, at least four kWh, at least five kWh, at least six kWh, at least seven kWh, at least eight kWh, at least nine kWh, or at least ten kWh. In some implementations, the second battery system 120 is a low voltage battery system having a capacity of about five kWh. Such a low voltage battery system 120 may power a maximum load of more than 20 kW and may have a normal load of about 1500 W. Such a low voltage battery system 120 may also have a weight of about 10-50 kg and be sized to fit in a volume of about 12,000 cm$^3$. In some aspects, the low voltage battery system can provide 1.25 kWh at about 12 volts.

The second battery system 120 may be used to power the one or more low voltage loads 150*a-n* when the first battery system 110 is disengaged. For example, the switch 500*a* shown in the closed position in FIG. 1 may be moved to the open position. Such a configuration may occur, for example, when the vehicle 100 is parked. It is to be understood that components other than a switch 500 may be used to disconnect and/or disengage the first battery system 110. If the second battery system 120 has a relatively high capacity (in comparison, for example, to a standard lead acid car battery), the vehicle's 100 low voltage loads 150 *a-n* may be powered for a relatively longer period of time without having to engage the first battery system 110.

In some aspects, the electric vehicle 100 may include a third battery system 130. The battery system 130 may have a capacity that is less than the capacity of both the first and the second battery system. The third battery system 130 may be used to power one or more battery control systems, switches, contactors, essential low voltage components and the like. In some aspects, the third battery system 130 is configured analogously to a standard starting, lighting, and ignition automobile battery. The third battery system 130 may be used, for example, to engage and/or disengage the first and/or second battery systems 110, 120. In some aspects, the third battery system 130 is included in a standard electric vehicle and the second battery system 120 is provided as an add-on feature. The third battery system 130 may be used to power the one or more switches 500a-e. The third battery system 130 may be re-charged by the first 110 and/or second battery system 120.

Figure 2:
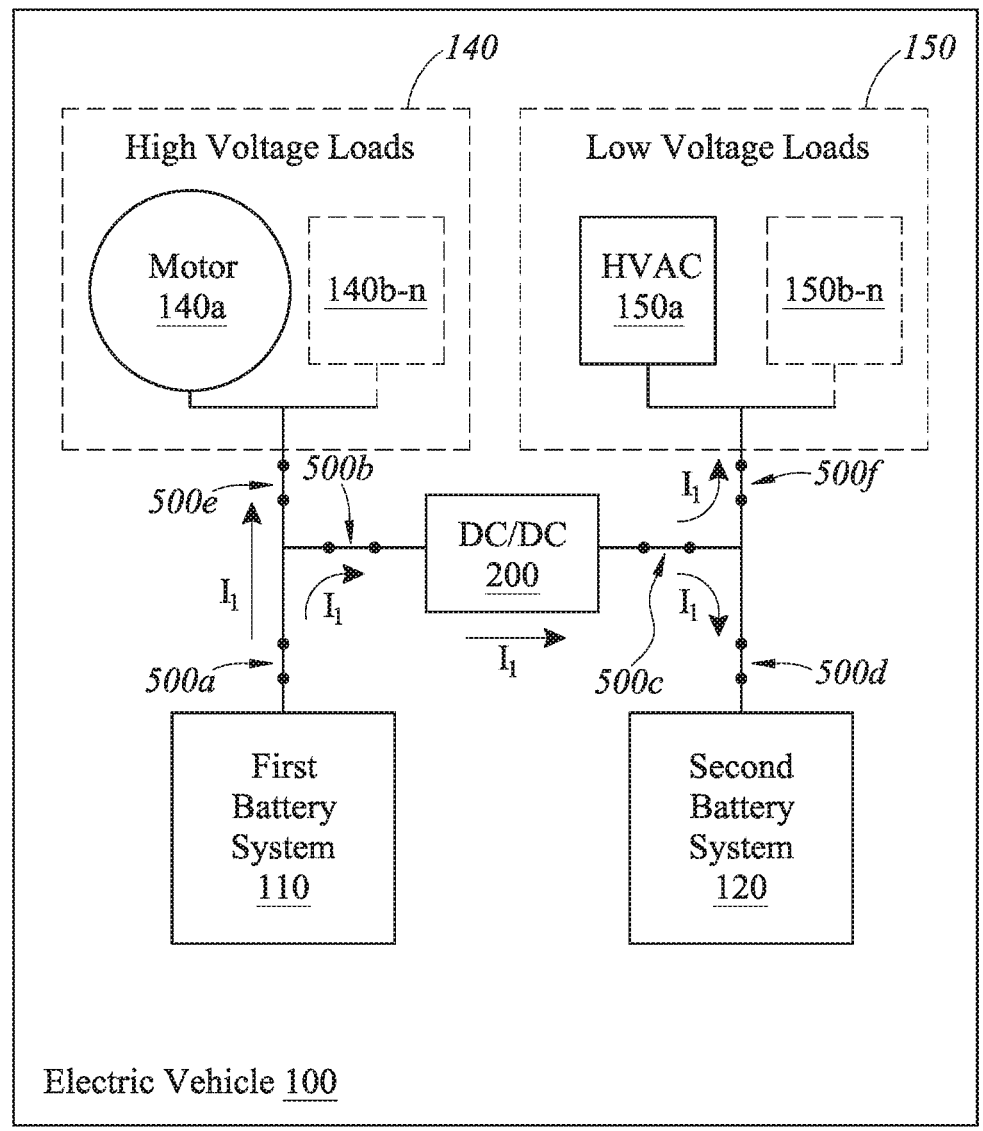
FIG. 2 shows the schematic illustration FIG. 1 where the first battery system powers the one or more high voltage loads and the one or more low voltage loads and re-charges the second battery system.

Moving on to FIG. 2, the vehicle 100 is shown in a configuration where charge is only being depleted from the first battery system 110. As will be appreciated, power may be drawn from one or both of the first and/or second battery systems 110, 120 depending on the vehicle's 100 needs. The first battery system 110 may be used to at least partially recharge the second battery system 120. The second battery system 120 may be used to at least partially recharge the first battery system 110. The first battery system 110 may be used to power the high voltage loads 140 and/or the low voltage loads 150. The second battery system 120 may be used to power the low voltage loads 150 and/or the high voltage loads 140.

As shown in FIG. 2, current $I_1$ may flow from the first battery system 110 to the one or more high voltage loads 140a-n and also through the DC-DC convertor 200. The DC-DC convertor 200 may step down the voltage from the first battery system 110. Current $I_1$ may then flow to the one or more low voltage loads 150a-n and/or to the second battery system 120. In this way, energy from the first battery system 110 is used to power the one or more high voltage loads 140a-n, at least partially power the one or more low voltage loads 150a-n, and may be used to at least partially recharge the second battery system 120. Circuitry may be used to prevent overcharging of the second battery system 120.

In some aspects, circuitry may engage the configuration shown in FIG. 2 when a terminal voltage of the second battery system 120 drops below a threshold level. For example, in some implementations, the second battery system 120 may have a terminal voltage of about 15 volts when fully charged. If the terminal voltage of the second battery system 120 falls to, for example, about 13.5 volts, then the first battery system 110 may be engaged as shown in FIG. 2. Such a configuration may be used to prevent over discharge of the second battery system 120. In some aspects, the second battery system 120 may be disconnected from the low voltage loads 150a-n and DC-DC convertor 200 by, for example, opening switch 500d to prevent over discharge of the second battery system 120.

In other implementations, one or more or all of the low voltage loads 150a-n may be disconnected from the first and second battery systems 110, 120. For example, the first battery system 110 may be configured to power the one or more high voltage loads 140a-n and recharge the second battery system 120 by opening switch 500f in FIG. 2. In some aspects, for example if the first battery system 110 is in a low state of charge, switch 500b of FIG. 2 may be opened to ensure that all remaining power is used to supply power to the propulsion motor 140a so that the vehicle 100 may have sufficient power to, for example, pull to the side of the road or exit the highway.

Figure 3:
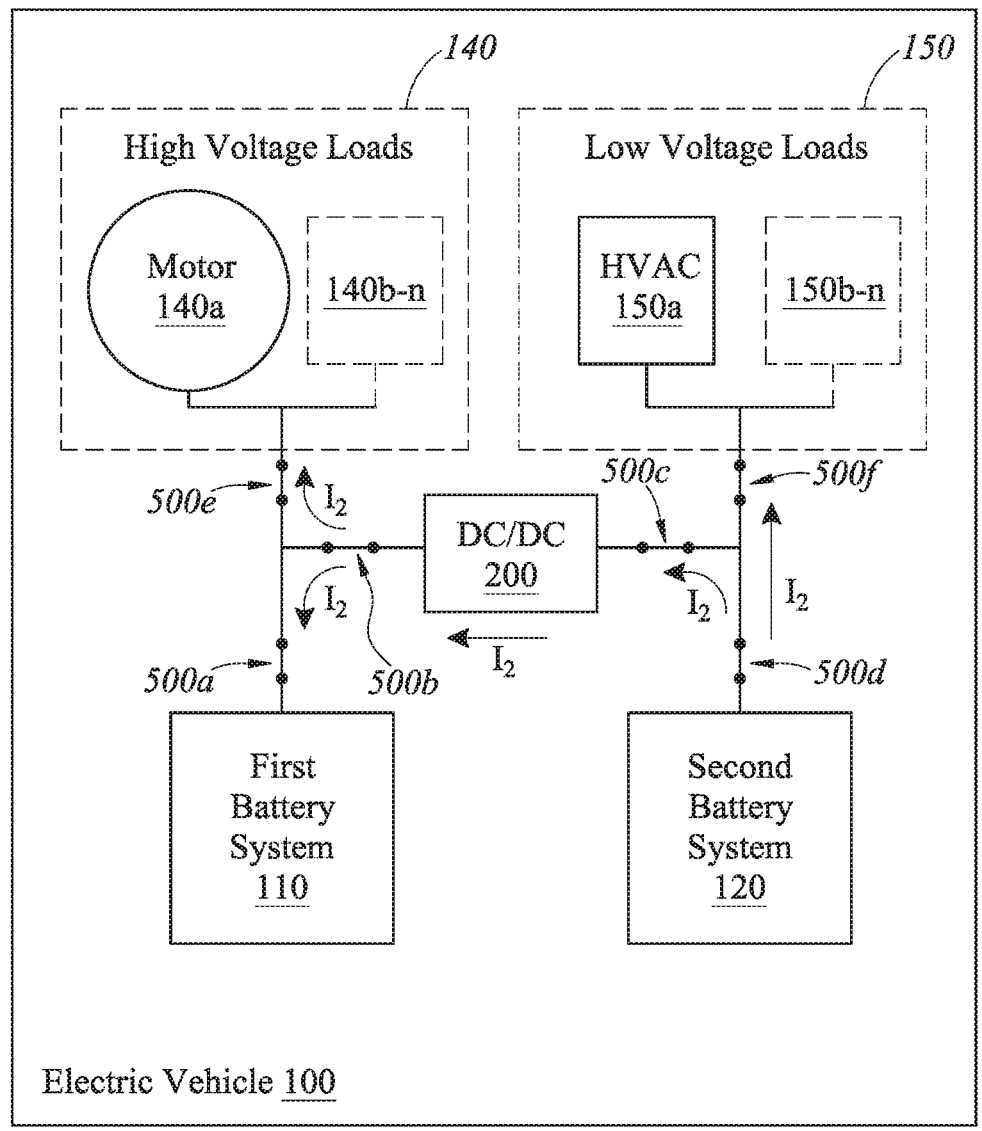
FIG. 3 shows the schematic illustration FIG. 1 where the second battery system powers the one or more low voltage loads and re-charges the first battery system.

FIG. 3 illustrates that the energy stored in the second battery system 120 may be used to power the one or more high voltage loads 140a-n and/or recharge the first battery system 110. Thus, the vehicle 100 is shown in a configuration where charge is only being depleted from the second battery system 120. In some aspects, for example, when the vehicle 100 is parked, it may be desirable to use the second battery system 120 to power the one or more low voltage loads 150a-n and to recharge the first battery system 110. Thus, switch 500e may be opened. Switch 500f may also be opened if, for example, it is desirable to only recharge the first battery system 110. Switch 500a may be opened to prevent overcharging and/or over discharging of the first battery system 110 as described above with respect to the second battery system 120.

A battery management system may be used to regulate the voltage/current that is supplied to the one or more high and/or voltage loads 140a-n, 150a-n. Such battery management systems can receive data from the first and/or second battery systems 110, 120 and/or the loads and/or user inputs and/or DC-DC convertor 200 as well as generate control signals to manage them. For example, in some aspects, control of vehicle speed is accomplished by regulating the voltage or the flow of current from an inverter through the motor 140a. Many control schemes can be utilized in the electric vehicle 100 including current control, voltage control, and direct torque control. The battery management systems can include a plurality of passive and/or active circuit elements, signal processing components, such as analog-to-digital converters (ADCs), amplifiers, buffers, drivers, regulators, or other suitable components. In some embodiments, the battery management system can also include one or more processors to process incoming data to generate outputs, such as the control signals. In some embodiments, the battery management systems can also include one or more components for communicating and sending and receiving data within the battery management system and/or with other components, switches, or circuitries in the electric vehicle 100. For example, the various components and circuits can be in communication with one another using protocols or interfaces such as a CAN bus, SPI, or other suitable interfaces. In some embodiments, the processing of incoming data can be at least in part performed by other components not in the battery management systems within the electric vehicle as the battery management system can communicate with other components.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

It will be appreciated by those skilled in the art that various modifications and changes may be made without departing from the scope of the described technology. Such modifications and changes are intended to fall within the scope of the embodiments, as defined by the appended claims. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

Those of skill would further appreciate that any of the various illustrative schematic drawings described in connection with the aspects disclosed herein may be implemented as electronic hardware (e.g., a digital implementation, an analog implementation, or a combination of the two, which may be designed using source coding or some other technique), various forms of program or design code incorporating instructions, or combinations of both.

The various controllers or switches disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium.

Various modifications to the aspects of the description above will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

Liquid Temperature Regulated Battery Pack for Electric Vehicles

Large lithium ion battery packs require that the individual battery cells within them be regulated in temperature during operation. Such battery packs may employ a cooling system having air cooled heat sinks (passive airflow or fan assisted). Other cooling systems use liquid cooling where the batteries are immersed in a liquid coolant and is circulated around the batteries. The liquid can also be heated to warm the batteries.

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiment" one will understand how the features of the system and methods provide several advantages over traditional systems and methods.

Some implementations include a battery housing having an enclosure and a channel passing through the enclosure. The channel may have an inlet for liquid inflow and an outlet in fluid communication with the inlet and for outflow of the liquid. The channel may be defined by at least two thermally conductive plates disposed on opposite sides of the channel. The plates may be configured to be in thermal contact with at least one battery. A dielectric fluid may flow through the channel.

In some implementations, a method of making a battery housing includes one or more of the following steps. The method may include forming a first support for at least one battery. The first support may have a first outwardly exposed thermally conductive surface. The method may also include forming a second support for at least one battery. The second support may have a second outwardly exposed thermally conductive surface. The method may include, for example, coupling the first support to the second support to form a channel in between the first and second thermally conductive surfaces. The channel may have an inlet for liquid inflow and an outlet in fluid communication with the inlet and for outflow of the liquid. The coupling step may include forming a fluid tight seal between the first support and the second support. The forming step may include injecting molding a plastic over an aluminum plate.

Some implementations include a system including at least one flow path for a liquid coolant. At least one pump may circulate the coolant through the flow path. At least one heater may heat the coolant in the flow path. At least one heat exchanger may cool the coolant in the flow path. At least two battery cell supports may be spaced apart by a flow path. The at least two battery cell supports may contain a plurality electrochemical cells. The electrochemical cells may each have a first end and a second end on an opposite side of the first end. The second ends may be secured in thermal contact with opposing sides of the flow path. A battery housing may be coupled to the flow path. The battery housing may enclose a plurality of electrochemical cells disposed therein. The housing may be configured such that coolant from the flow path is in thermal contact with at least two opposing sides of the electrochemical cells disposed therein. The plurality of electrochemical cells in the housing may be configured to have a higher terminal voltage than the electrochemical cells in the supports.

Disclosed herein is battery pack having at least one cooling channel disposed therein. The cooling channel may be formed by two cooling plates that are spaced apart by a gap. The cooling plate may form a wall of an enclosure. The remaining walls of the enclosure may be formed of material that is not as thermally conductive as the cooling plate. For example, the cooling plate may include aluminum and the remaining portions of the enclosure may include a plastic. The enclosure may house a plurality of electrochemical cells, such as, for example, lithium ion battery cells. Other types of electrochemical cells are also contemplated. Liquid coolant may be circulated through the channel. Thus, the channel may have an inlet and an outlet and the liquid coolant may flow from the inlet to outlet. In some aspects the channel includes a flow divider. The fluid may be configured to flow in a U-shape-like path from the inlet to the outlet.

Typical electric vehicles almost exclusively draw their power from one high capacity, high voltage battery system. The high capacity, high voltage battery system is used to power the motors that propel the vehicle and is stepped down with one or more DC-DC convertors to power other electrically powered systems. When the high capacity, high voltage battery system is not engaged, for example, when the vehicle is parked, a lower capacity, lower voltage battery may be relied upon. This second battery may function as a typical automobile battery and may be used to start the vehicle and power other components such as, for example, the windows, door locks, and stereo when the high capacity, high voltage battery is disengaged. The second battery is typically recharged by the high capacity, high voltage battery when the vehicle is driving and/or when the high voltage battery system is engaged.

The high voltage battery system may be configured to power the vehicle components that require relatively high voltages. For example, the high voltage battery system may be configured to power one or more electric motors that are used to propel the vehicle. The low voltage battery system may be configured to power the vehicle components that require relatively lower voltages in comparison to the high voltage battery system. For example, the low voltage battery system may be configured to power the cabin HVAC system(s), the windows, the locks, the doors, the audio and entertainment systems, infotainment systems, wireless modems and routers, touch screens, displays, navigation systems, automated driving systems, and the like. Low voltage systems or components may generally refer to systems or components that require less voltage than the motors that propel the vehicle.

A vehicle with at least two separate high capacity energy storage systems can have several advantages. For one, the low voltage system can power vehicle systems for long periods of time without engaging the high voltage battery system. Energy is lost when electric power is moved between battery systems. For example, DC-DC converters are not perfectly efficient and energy is lost when a DC-DC convertor is operated. Thus, if the low voltage system has sufficient storage capabilities, it can be used to power systems other than the propulsion motors for longer periods of time and the need for recharging the low voltage system and/or the need to draw power from the high voltage system, may be reduced or eliminated.

A relatively high capacity, low voltage battery requires a heating and/or cooling system. At very low temperatures, the electrochemical cells in the high capacity, low voltage battery pack may not be capable of powering the required loads. High temperatures may cause battery failure and/or fire.

The following description is directed to certain implementations for the purpose of describing the innovative aspects of this disclosure. However, a person having ordinary skill in the art will readily recognize that the teachings herein can be applied in a multitude of different ways.

As used herein, the term "electric vehicle" can refer to any vehicle that is partly or entirely operated based on stored electric power, such as a pure electric vehicle, plug-in hybrid electric vehicle, or the like. Such vehicles can include, for example, road vehicles (cars, trucks, motorcycles, buses, etc.), rail vehicles, wheeled robots, or the like.

In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Reference may be made throughout the specification to a "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as "low voltage" battery systems. Some vehicles may use two or more 12 volt batteries to provide higher voltages. Thus, it will be clear that the systems and methods described herein may be utilized with low voltage battery arrangements in at least the range of 4-34 volts without departing from the spirit or scope of the systems and methods disclosed herein.

The present disclosure may be implemented to achieve one or more advantages other traditional battery cooling systems. In some aspects, the amount of coolant that is required is minimized. For example, by utilizing the disclosed geometry, the channel can allow the liquid to cool two physically separated sets of battery cells at the same time.

In certain aspects, the present system may be less expensive to manufacture than previous systems. For example, certain aspects achieve the desired heat conduction properties while primarily relying on components made of low cost plastics. Manufacturing time may also be reduced and/or simplified. For example, two halves of the housing may be substantially similar and include only one conductive surface each. These two halves may be joined in one step to form a cooling channel in between the two halves.

Such enclosures can also be configured as modular battery packs having the desired electrical characteristics. The modular packs may be added and/or removed as needed. For example, if a user desires extra battery lifetime, additional packs may be easily added to the system. In some aspects, the modular packs may be connected to a cooling system that is also used to cool/heat the higher voltage batteries that are used to power the vehicles propulsion motors and/or drivetrain. Thus, additional pumps, fans, heat exchangers, and the like may not be required. In some aspects, the inlet and the outlet for coolant are located on the same side of the housing such that connection to coolant lines is simplified.

Figure 4:
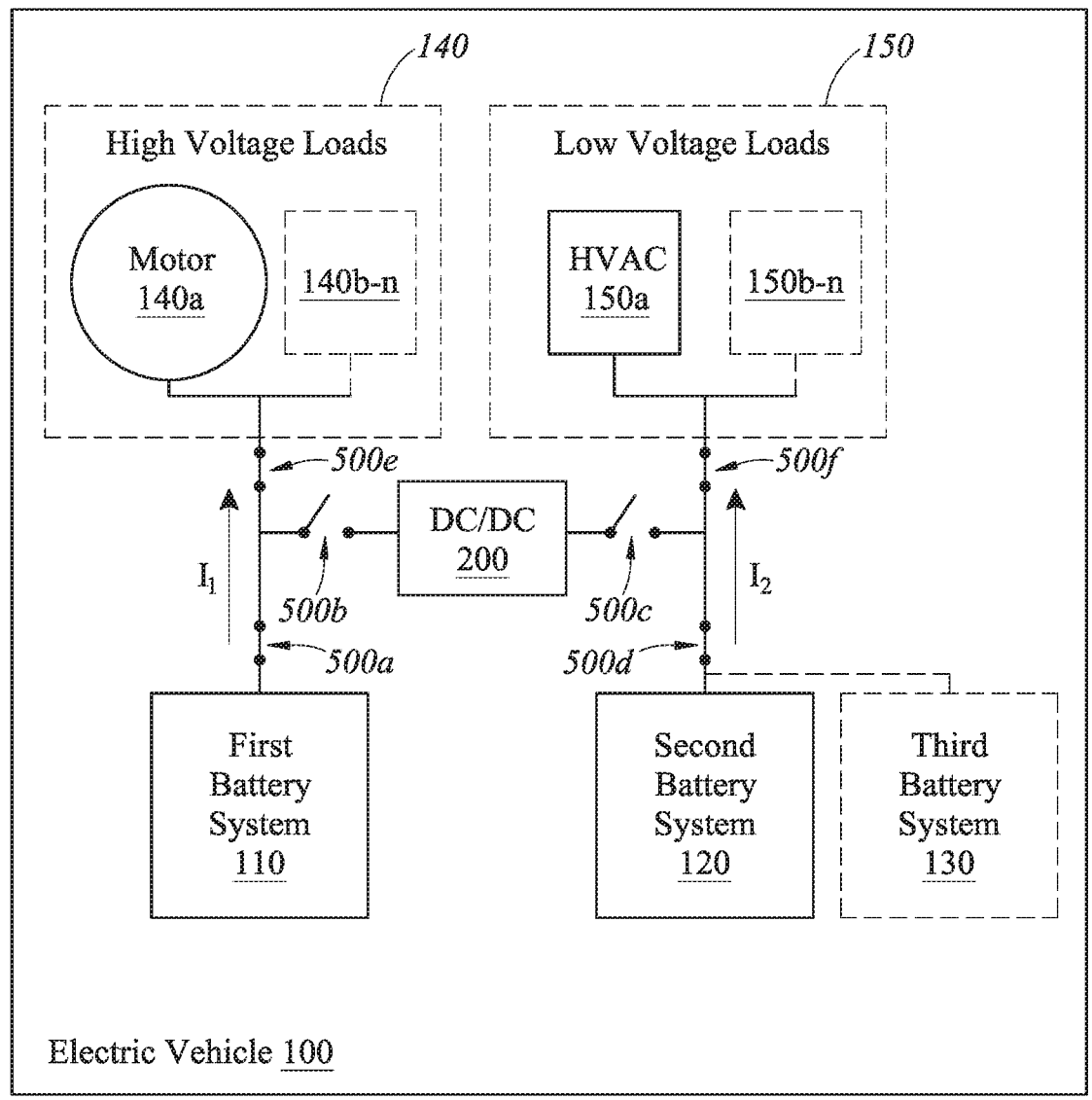
FIG. 4 is a schematic illustration of an electric vehicle having two battery systems according to an exemplary implementation. As shown, the first battery system powers one or more high voltage loads and the second battery system powers one or more low voltage loads.

FIG. 4 schematically illustrates an electric vehicle 100 having a first battery system 110 and a second battery system 120, and is similar to FIG. 1. The first battery system 110 may be electrically connected to one or more high voltage loads 140. The first battery system 110 may include one or more batteries connected in series and/or in parallel. The first battery system 110 may be controlled by one or more battery controllers or battery control systems (not shown). Such controllers may include circuitry capable of regulating and/or controlling the available voltage differences and/or current.

The one or more high voltage loads 140 may include an electric motor 140a. The electric motor 140a may be configured to propel the vehicle 100. The electric motor 140a may be an interior permanent magnet motor. One or more inverters may be also be provided. It should be appreciated that while the motor 140a is an electrical machine that can receive electrical power to produce mechanical power, it can also be used such that it receives mechanical power which it converts to electrical power. Additional loads 140b-n may also be electrically connected to the first battery system 110. The additional loads 140b-n may include, for example, additional motors, power train components, and the like.

As shown in FIG. 4, current $I_1$ from the first battery system 110 may flow to the one or more high voltage loads 140. That is to say, the first battery system 110 may power the one or more high voltage loads 140a-n. A switch 500b in the open position is shown between the first battery system 110 and a DC/DC convertor 200. Thus, current $I_1$ does not flow from the first battery system 110 to the one or more low voltage loads 150a-n nor to a second battery system 120.

The second battery system 120 may be electrically connected to one or more low voltage loads 150. The second battery system 120 may include one or more batteries connected in series and/or in parallel. The second battery system 120 may be controlled by one or more battery controllers (not shown).

The one or more low voltage loads 150 may include an HVAC 150a. The HVAC 150a may be configured to heat, cool, and/or circulate air through the vehicle's passenger cabin. The HVAC 150a may include various types of heating, cooling, and ventilation components. For example, the HVAC 150a may include one or more heating elements, seat heaters, floor heaters, defrosters, deicers, fans, filters, air conditioners, compressors, and the like.

Additional loads 150b-n may also be electrically connected to the second battery system 120. The additional loads 150b-n may include, for example, additional motors (e.g. for windows, door locks, sun roofs, compartments), audio system components, infotainment system components, computers, navigation system components, mobile phones, electrical outlets, refrigerators, and the like. A battery management system (not shown) may also be used to regulate the voltage/current that is supplied to the one or more low voltage loads 150a-n.

As shown in FIG. 4, current $I_2$ from the second battery system 120 may flow to the one or more low voltage loads 150a-n. That is to say, the second battery system 120 may power the one or more low voltage loads 150a-n.

A DC-DC convertor 200 may be used to connect the first and second battery systems. Switches 500a-e may be provided. A switch 500c in the open position is shown between the second battery system 120 and the DC/DC convertor 200. Thus, current $I_2$ does not flow from the second battery system 120 to the one or more high voltage loads 140a-n nor to the first battery system 110. While switches 500a-e are shown in FIG. 4, other control mechanisms may be used. Current controllers and/or battery controllers and/or DC-DC convertor controllers may be utilized to control which battery system(s) is(are) utilized. The DC-DC convertor 200 may be a bidirectional DC-DC convertor.

In some aspects, the electric vehicle 100 may include a third battery system 130. The battery system 130 may have a capacity that is less than the capacity of both the first and the second battery system. The third battery system 130 may be used to power one or more battery control systems, switches, contactors, essential low voltage components and the like. In some aspects, the third battery system 130 is configured analogously to a standard starting, lighting, and ignition automobile battery. The third battery system 130 may be used, for example, to engage and/or disengage the first and/or second battery systems 110, 120. In some aspects, the third battery system 130 is included in a standard electric vehicle and the second battery system 120 is provided as an add-on feature. The third battery system 430 may be used to power the one or more switches 500a-e. The third battery system 130 may be re-charged by the first 110 and/or second battery system 120.

Figure 5:
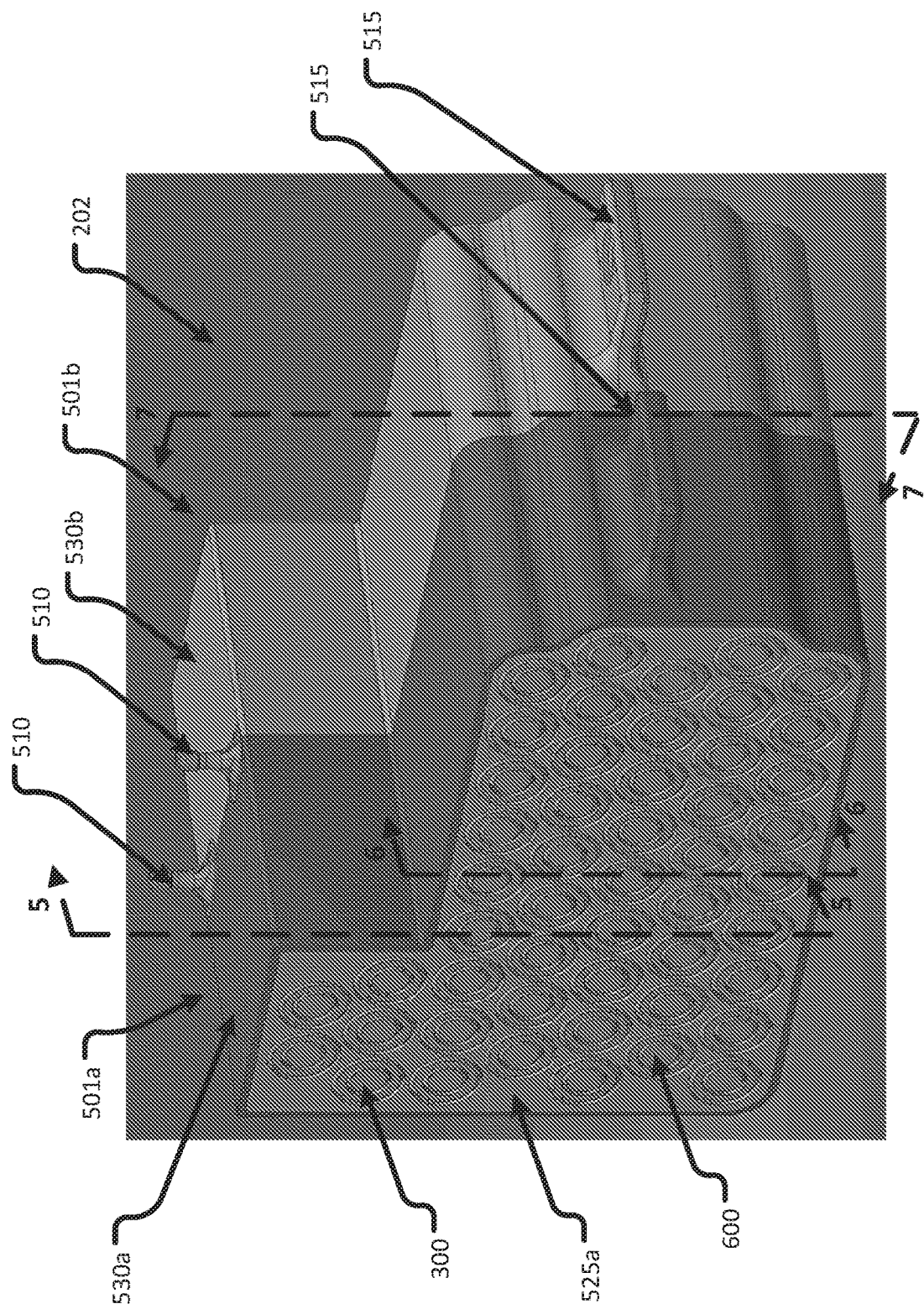
FIG. 5 is a left-side perspective view of an exemplary implementation of a battery housing. As shown, the housing may include a plurality of substantially cylindrical electrochemical cells.

Turning to FIG. 5, a battery housing 202 according to an exemplary implementation is illustrated. FIG. 5 is a left-side perspective view of the housing 202. The housing 202 may be formed by coupling a left housing part 501a with a right housing part 501b. A plurality of electrochemical cells 600 may be placed into the housing 202. In the illustrated embodiment, fifty cells 600 are placed in the left housing part 501a and fifty cells 600 are placed in the right housing part 501b. Thus, the housing 202 includes one hundred total cells 600. However, any number of cells 600 may be included in the housing 202 and/or the housing parts 501a, 501b.

Figure 6:
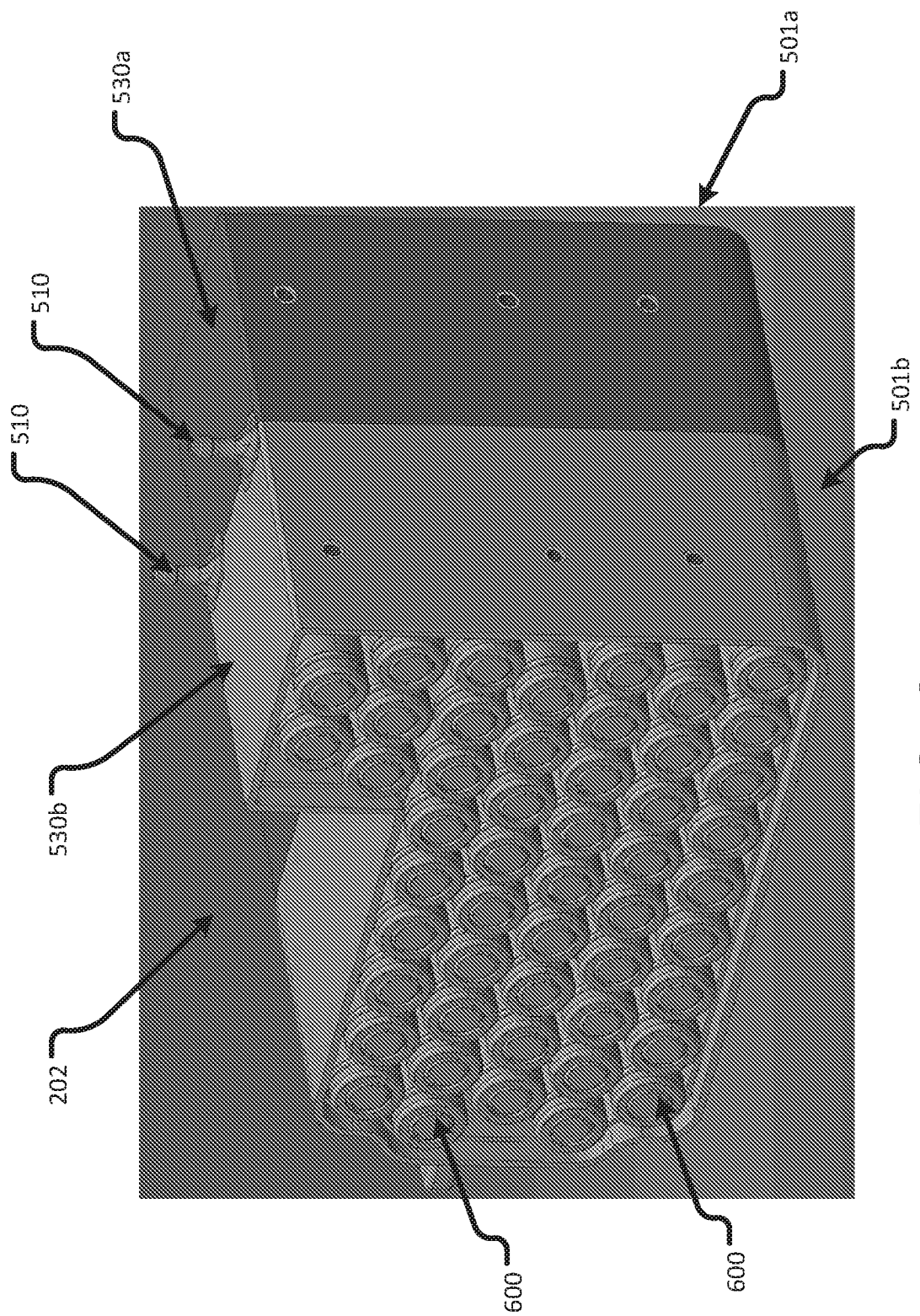
FIG. 6 is a right-side perspective view of the housing of FIG. 5 with the cell retaining wall removed.
Figure 7:
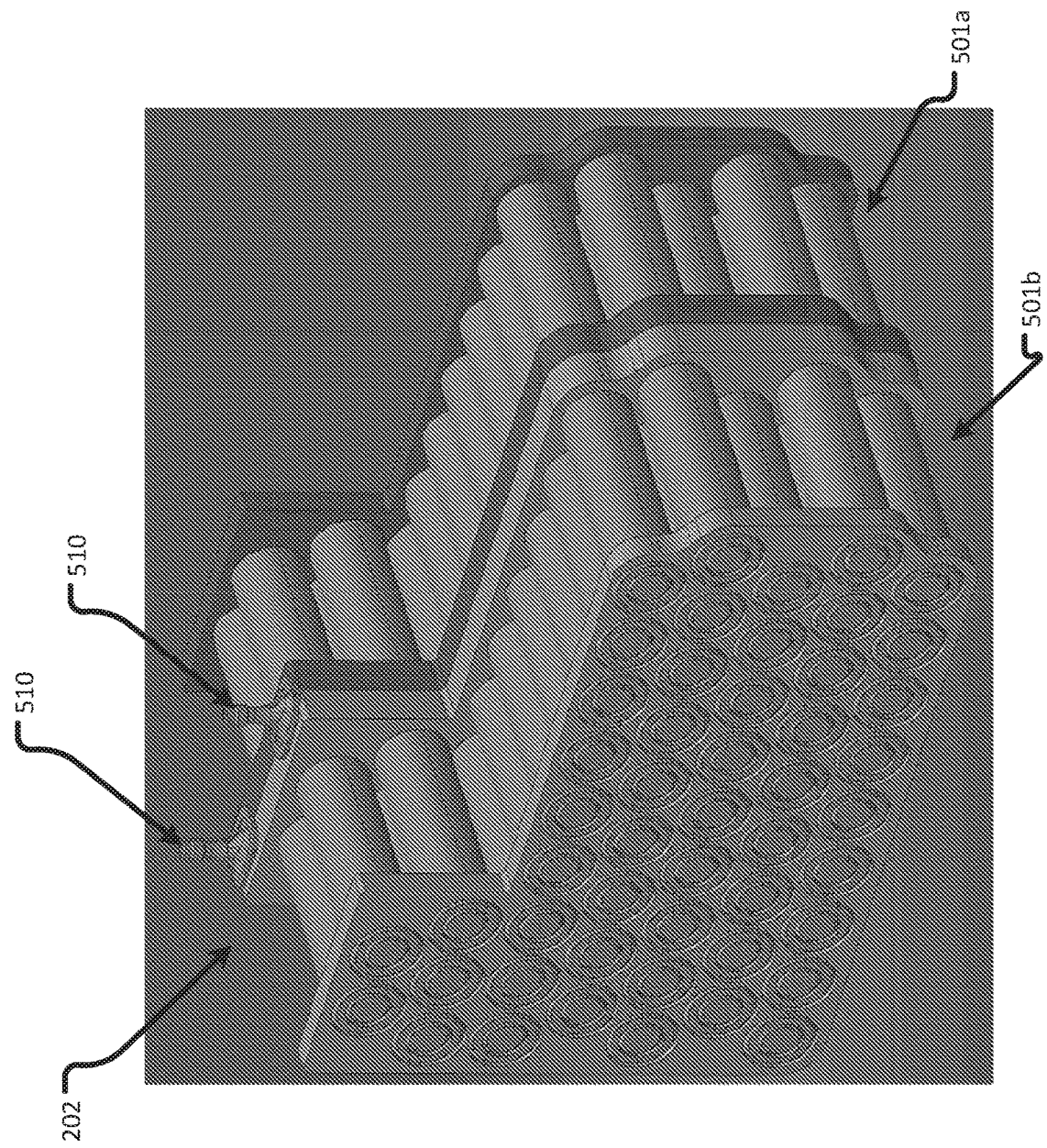
FIG. 7 is the same as FIG. 5 with the cell cover walls removed.

The cells 600 may be cylindrical in shape and have two circular ends that are opposite one another. The side of the cells 600, visible in FIG. 8, may include a positive terminal and a negative terminal disposed thereon. The cells 600 may be electrically connected in parallel and/or in series with circuitry that is not shown. A left cell retaining wall 525a may at least partially secure the cells 600 in the left housing 501a. A right cell retaining wall 525b (not shown in FIG. 8) may at least partially secure the cells 600 in the right housing 501b. The cell retaining walls 525a, 525b may be formed of plastic. FIG. 6 is a right-side perspective view of the housing 202 with the cell retaining walls 525a, 525b removed. Left and right cell cover walls 530a, 530b may cover the lengthwise portions of the cylindrical cells 600. FIG. 7 is a left-side perspective view of the housing 202 with the cell cover walls 530a, 530b removed. The cell cover walls 530a, 530b may be plastic.

Brackets 515 may be provided. The brackets 515 may be used to at least partially secure the housing 202 to the vehicle. Coolant inlet/outlets 510, described further below, may be provided on the top side of the housing 202.

Figure 8:
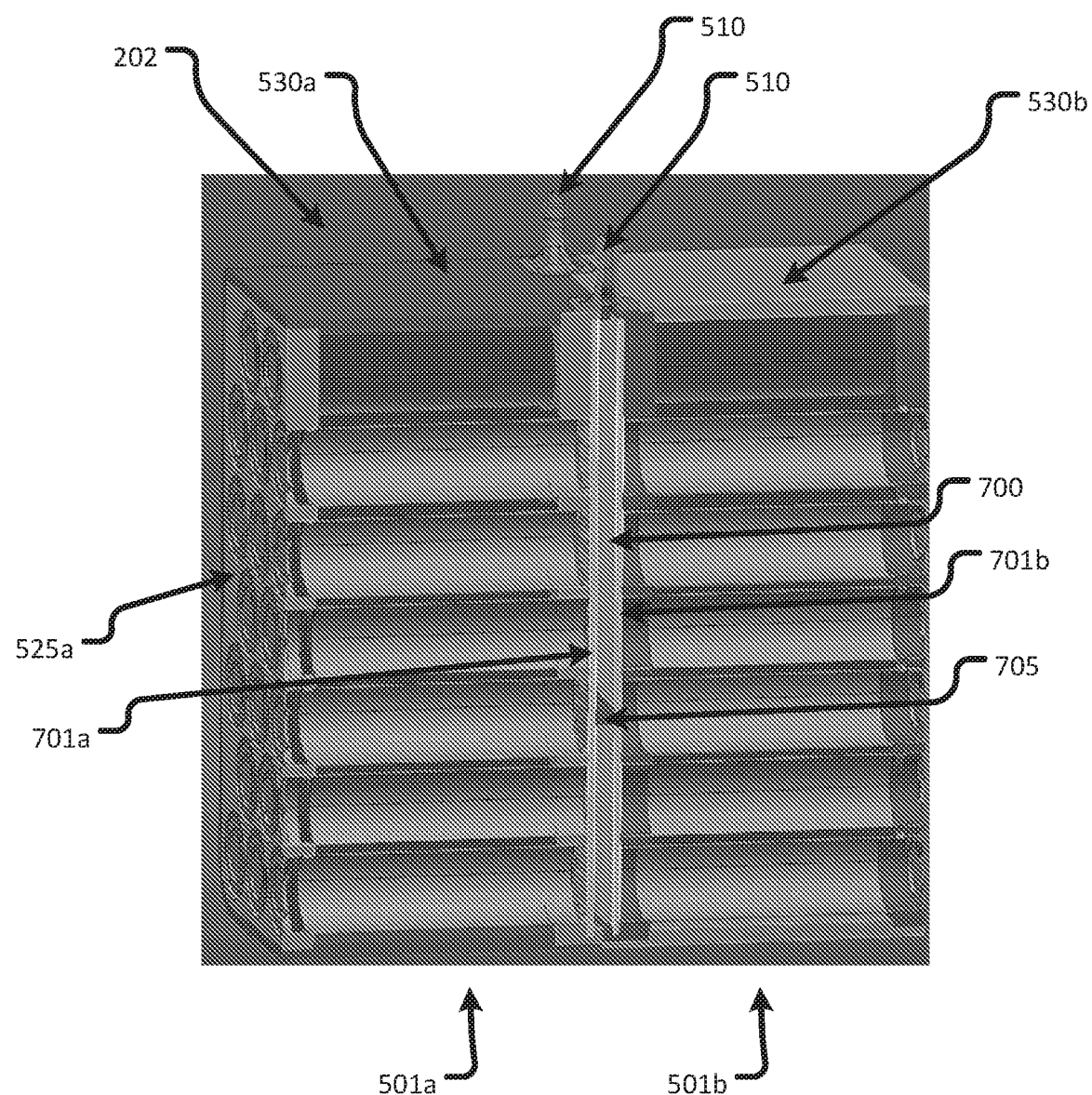
FIG. 8 is a cross-sectional view of FIG. 5 about the line 5-5.
Figure 9:
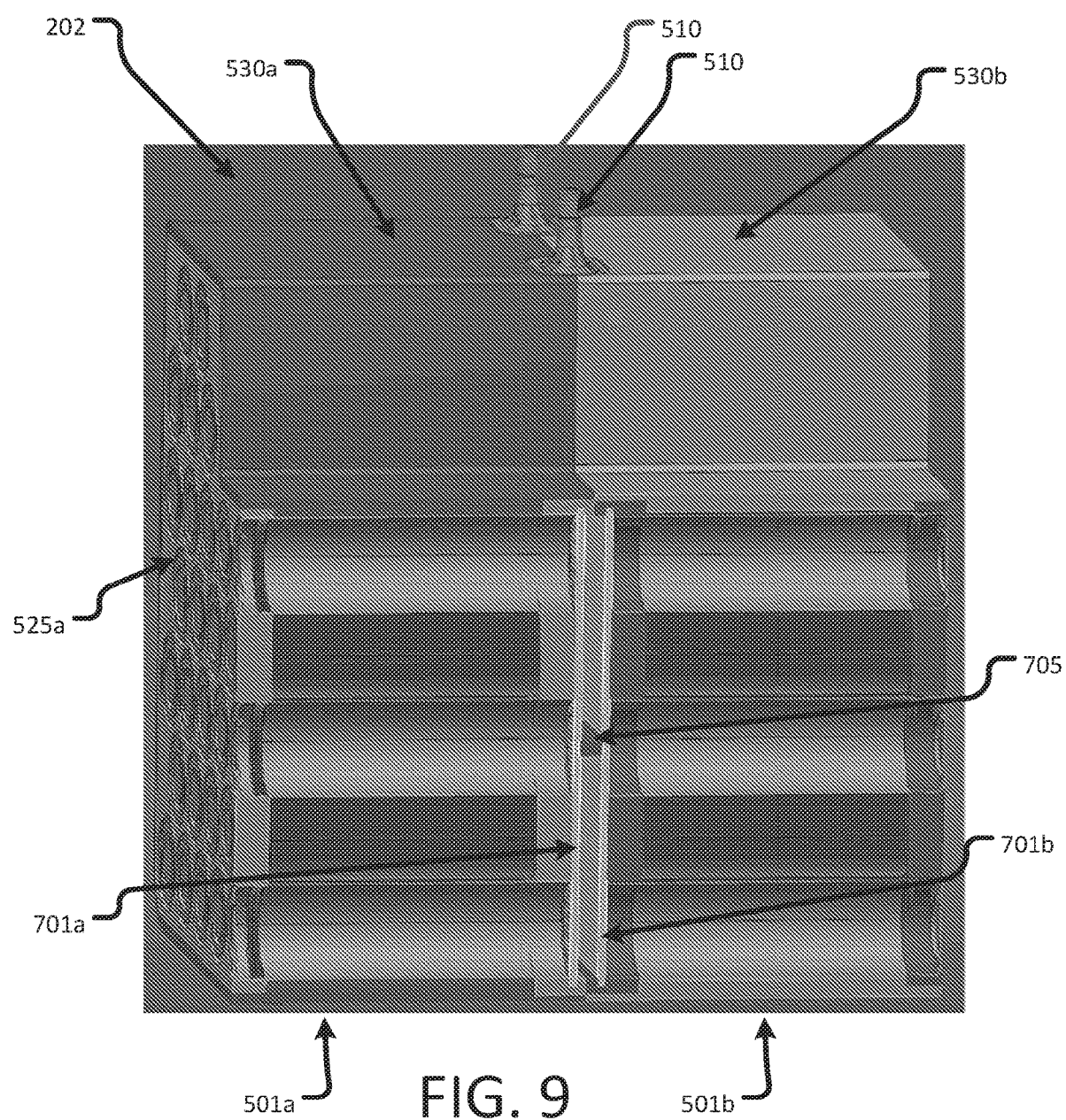
FIG. 9 is a cross-sectional view of FIG. 5 about the line 6-6.

The cut-away views in FIGS. 8-9 illustrate that the housing 202 includes a channel 700 disposed therethrough. The channel 700 may be at least partially defined by two thermally conductive plates 701a and 701b. That is to say, the plates 701a and 701b may be spaced apart by a gap. The plates 701a, 701b may be formed of aluminum. A flow diverter 705 may be disposed within the channel 700. Liquid coolant may be pumped into one of the inlet/outlet 510 and out of the other inlet/outlet 510. The liquid coolant may be any suitable coolant. For example, the liquid coolant may be a dielectric coolant. The coolant may be configured to transfer heat from the plates 701a, 701b to the coolant. In some embodiments, coolant or cooling liquid or cooling fluid may include, for example, one or more of the following: synthetic oil, polyolefin (e.g., poly-alpha-olefin ("PAO")), ethylene glycol, ethylene glycol and water, and phase change materials ("PCM").

As will be understood, at least one side of the cells 600 may be placed into thermal contact with the plates 701a, 701b. Preferably, the side of the cell is the side that is opposite to the side of the cell 600 that includes the positive and negative terminal is placed into thermal contact with the plates 701a, 701b. The cells 600 may be secured into place with an adhesive. Preferably, the adhesive is an epoxy having a high thermal heat transfer coefficient. In this way, heat generated from the cells 600 may flow from the cells 600 to the plate 701a, 701b and into the coolant that flows through the channel 700. In some aspects, when the temperature of the cells 600 is below the desired operating temperature, the coolant may be heated and heat may flow from the coolant to the plates 701a, 701b in order to heat the cells 600.

Figure 10:
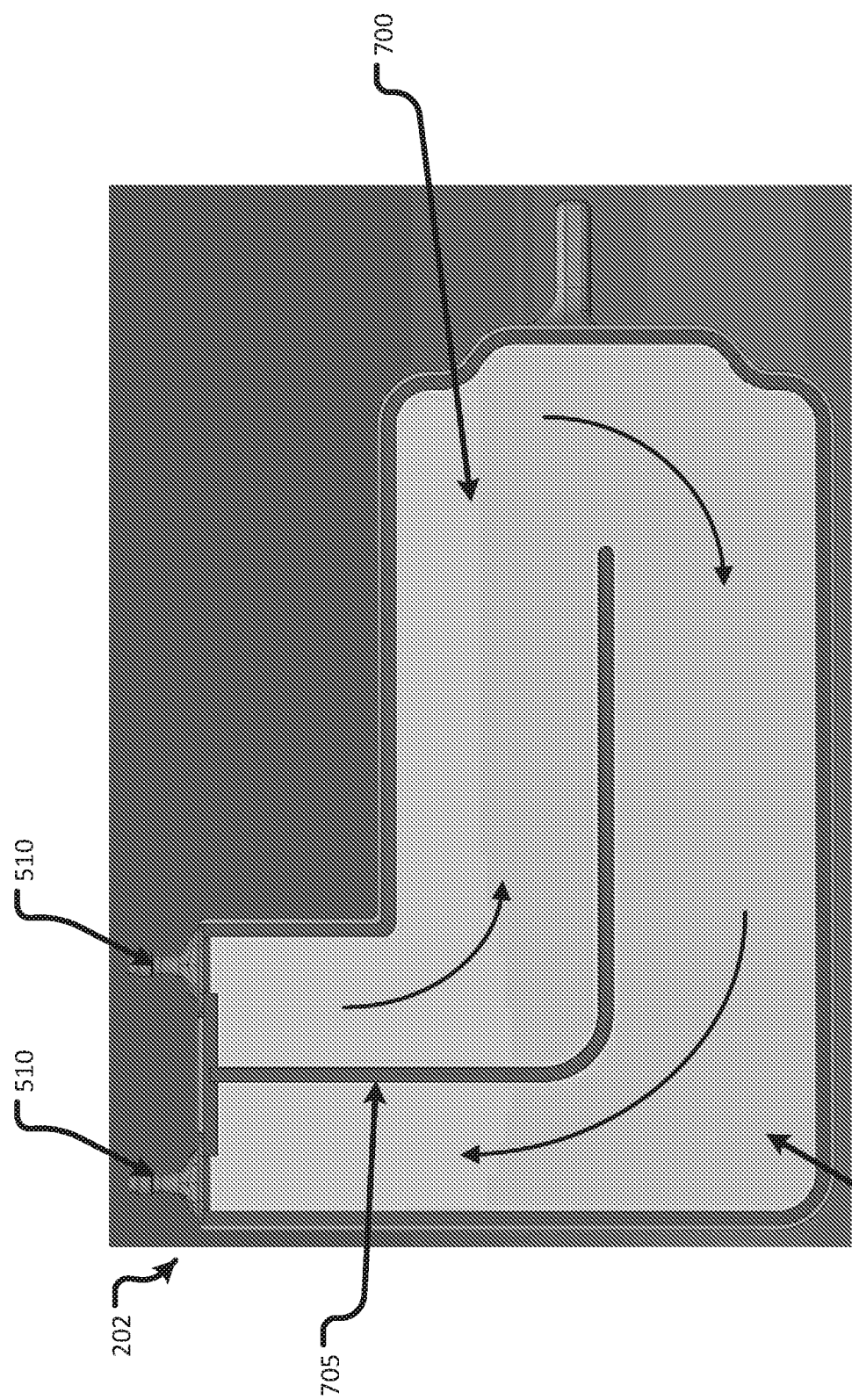
FIG. 10 is a cross-sectional view of FIG. 5 about the line 7-7.

The cross-section view of FIG. 10 illustrates that the coolant may be configured to circulate through the housing 202. For example, the flow diverter 705 in the channel 700 may direct fluid in path from one inlet/outlet 510 to the other inlet/outlet 510. In some aspects, the flow path may include at least one substantially U-shaped bend. While the coolant flow is shown as traveling in the clockwise direction, the opposite direction of fluid is also contemplated. In some aspects, flowing coolant in the counter-clockwise direction may allow for the coolant to warm and thus naturally rise as it moves towards the outlet 510.

Figure 11:
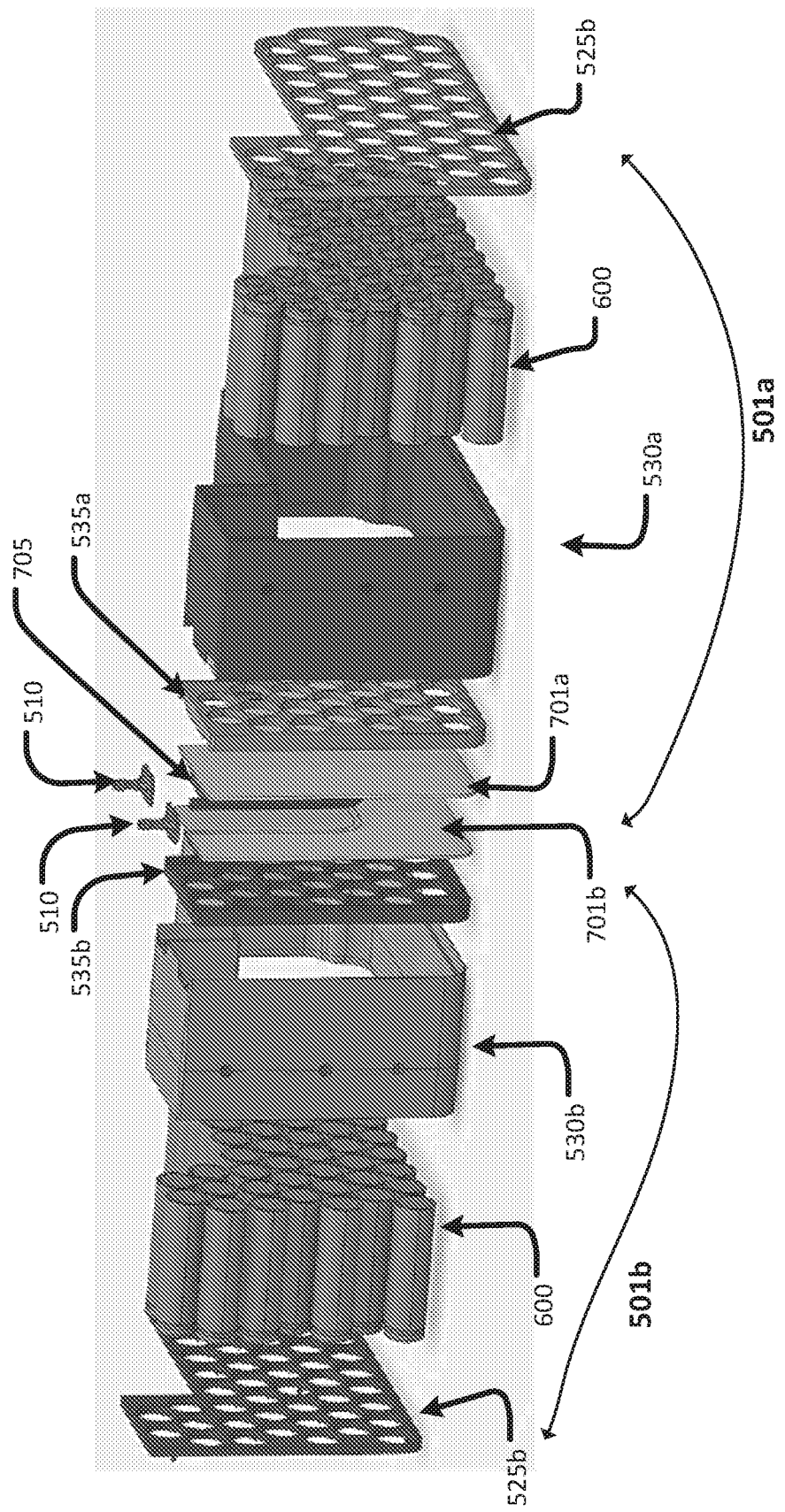
FIG. 11 in an exploded perspective view of the housing of FIG. 5.

FIG. 11 is an exploded view of the housing 202. As shown, each housing part 501 may include an outer cell retaining wall 525, a cell cover wall 530, an inner cell retaining wall 535, and a thermally conductive plate 701. The cell retaining wall 525, cell cover wall 530, and inner cell retaining wall 535 may be formed of a material that is not as thermally conductive as the plate 701. For example, these parts may be formed of plastic and the plate 701 may be formed of metal. In some aspects, two housing halves 501a, 501b are sealed together to form a housing 202 having an internal flow path. The inner cell retaining walls 535, plates 701, and flow diverter 705 are further detailed in FIGS. 12-13.

Figure 12:
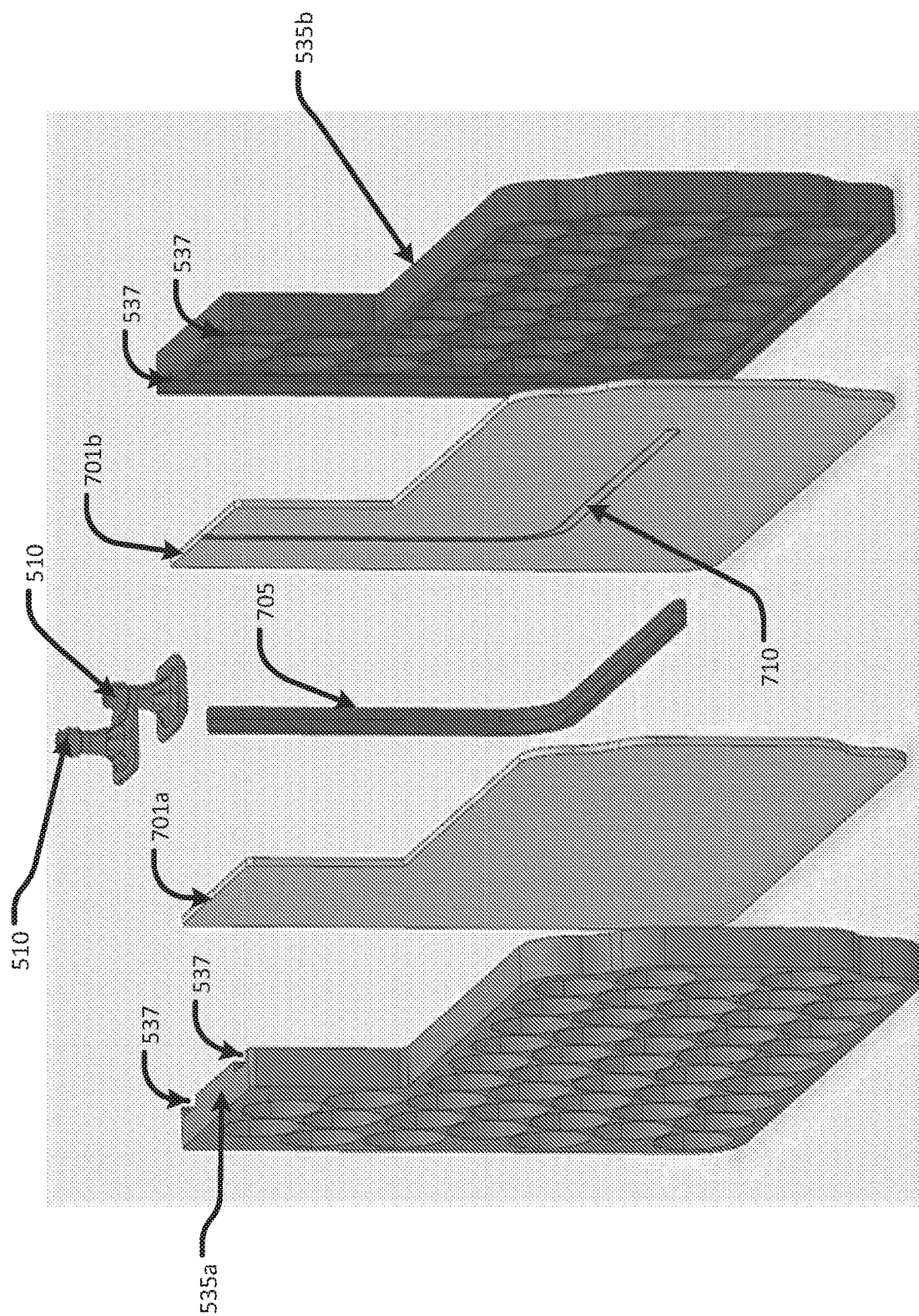
FIG. 12 is an exploded perspective view of the channel assembly showing.
Figure 13:
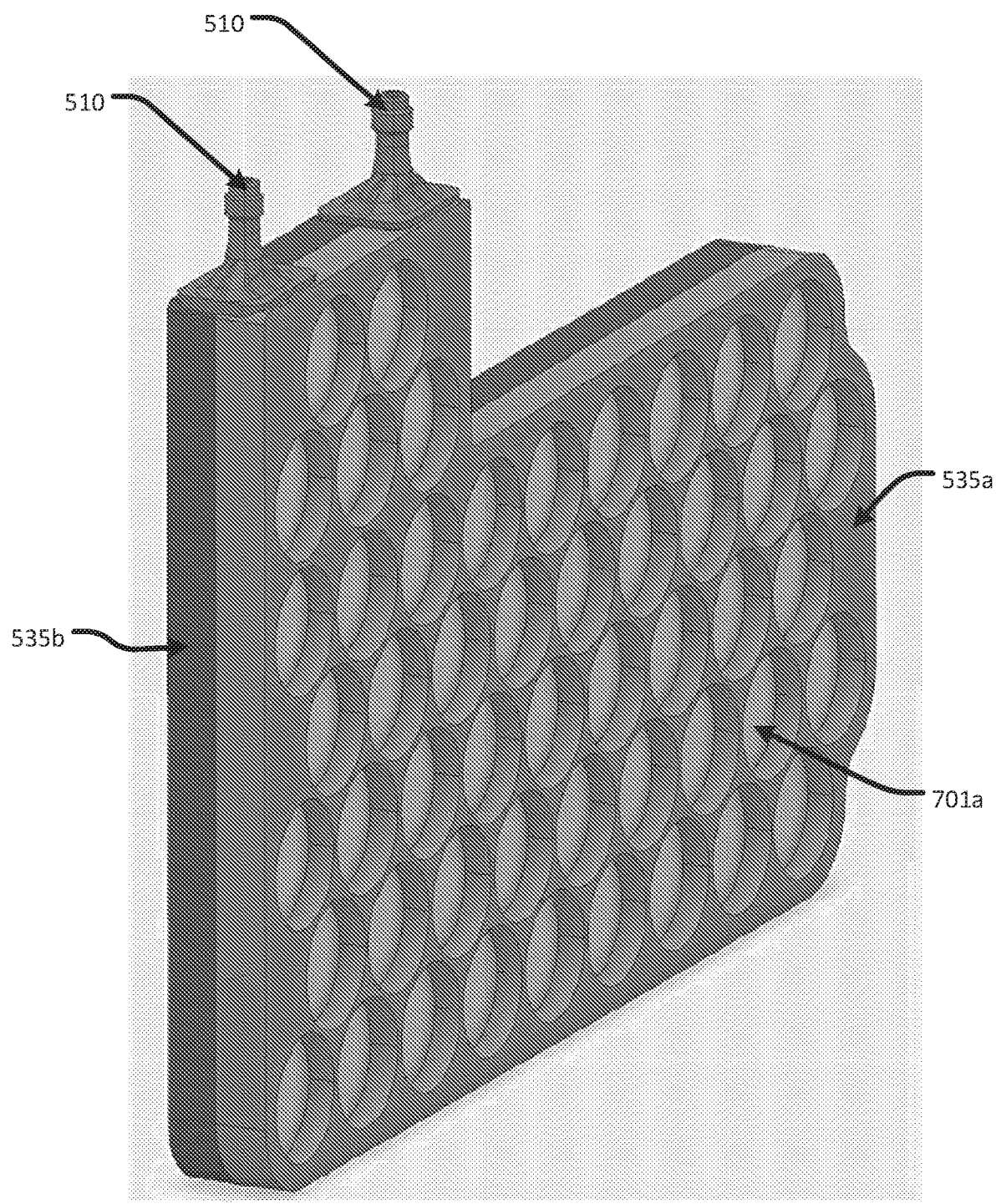
FIG. 13 is a perspective view of the assembled channel assembly of FIG. 12.

The housing may be manufactured according to the following method. While the steps are described in a particular order, other ordering of the steps is possible. FIG. 12 illustrates that an exploded view of the channel assembly. The assembled channel assembly is shown in FIG. 13. An inner retaining wall 535 and plate 701 may be formed in a single step. For example, the inner retaining wall 535 may be manufactured using an injection molding process over the plate 701. The inner retaining wall 535 may include a plurality of cell carriers 540. The carriers 540 may be sized and shaped to at least partially receive a portion of a cell 600. The two opposing inner retaining wall 535 may be secured together such that a gap is formed in between the two plates 701a, 701b. The two opposing inner retaining wall 535 may be coupled together such that a fluid tight seal is created. The gap between the plates 701a, 701b may form a coolant channel 700.

As shown in FIG. 12, a flow diverter 705 may be inserted into a groove 710 in one or both plates 701a, 701b. The groove 710 may be stamped and or machined into either one or both of the plates 701a, 701b. The flow diverter 705 may be further secured to the plate(s) 710 with an adhesive. The inner cell retaining walls 535 may include at least two pre-formed openings halves 537 which can be coupled to the inlet/outlets 510 to form a fluid inlet and a fluid outlet. Coolant may be pumped into the inlet and flowed over the plates 701 to transfer heat to and/or from the plates 701. The coolant may exit an outlet.

In other implementations, the cell cover wall 530, inner cell retaining wall 535, and plate 701 are formed in a single step. For example, the cell cover wall 530, inner cell retaining wall 535, and plate 701 may be formed by injecting molding over a metal plate 701. In other implementations, the outer retaining wall 525, cell cover wall 530, inner cell retaining wall 535, and plate 701 are formed in a single step by injecting molding over a metal plate 701.

Cells may be inserted into the cell carriers 540 of the inner retaining walls 535. An adhesive may be used to bond the cells to the plate 701 and/or the inner cell retaining wall 535. The adhesive preferable has a high thermal heat transfer coefficient. The cell carriers 540 and/or the inner retaining walls 535 may thus form a support for at least a portion of the cells and inhibit the movement of the cells in at least the longitudinal, lateral, and/or transverse direction.

Figure 14B:
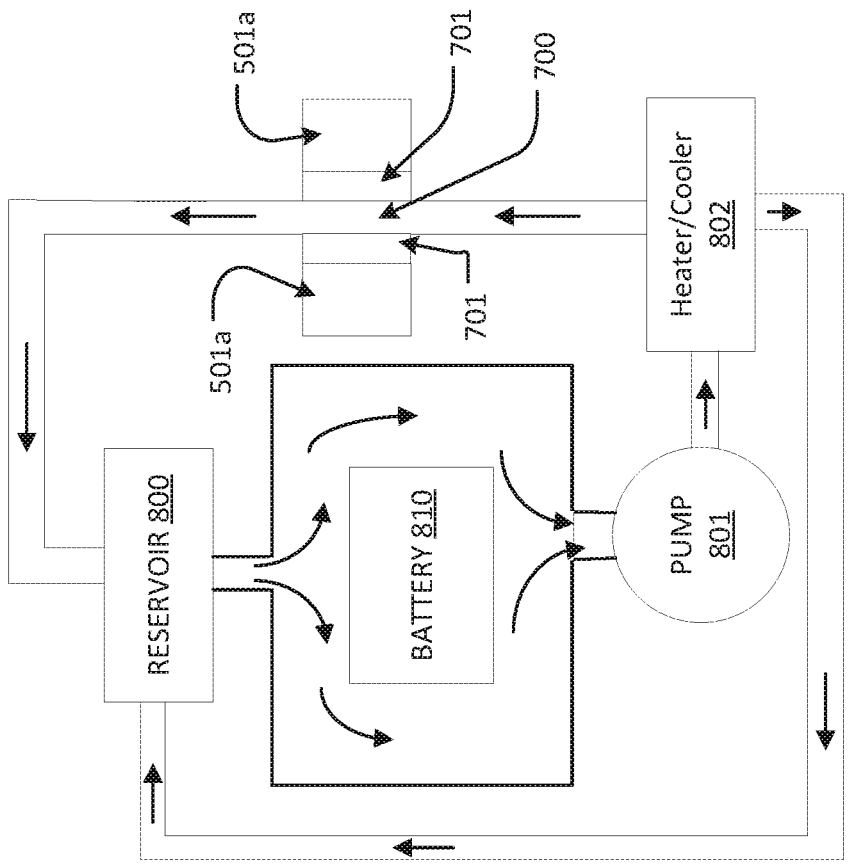
FIG. 14B is a schematic diagram, similar to FIG. 14A, illustrating another exemplary implementation of a cooling system for an electric vehicle.
Figure 14A:
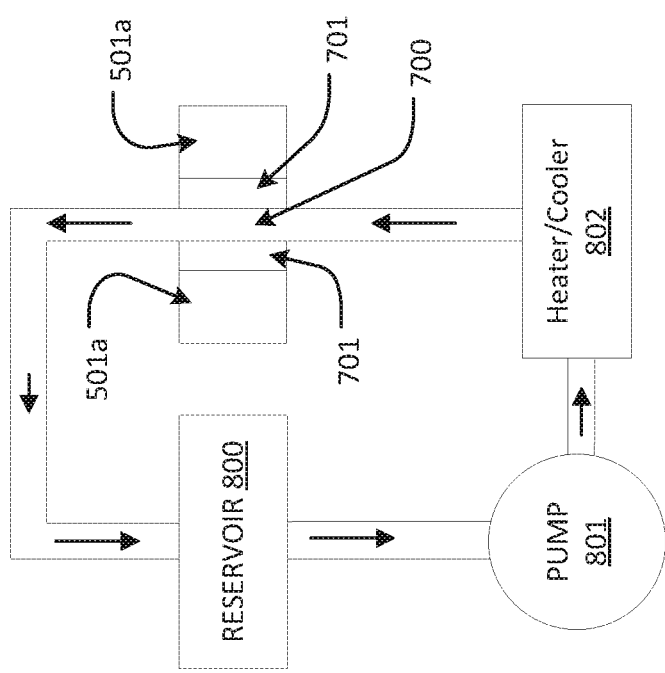
FIG. 14A is a schematic diagram illustrating an exemplary implementation of a cooling system for an electric vehicle.

FIG. 14A schematically illustrates how the housing 202 may be implemented in an electric vehicle. As shown, coolant may be pumped with a pump 801 through a heater and/or a cooler 802. The heater may raise the temperature of the coolant when necessary. The heater may include an electric heater. The cooler may lower the temperature of the coolant when necessary. The cooler may include a heat exchanger. The coolant may then pass through the channel 700 and may heat and or cool the cells as described above. The channel may be disposed in a housing 202 as described above. The housing may house a low voltage battery system. The coolant may then flow through a reservoir 800 for excess coolant. It is noted that the components may be arranged in any order and are not limited to the configuration illustrated in FIG. 14A.

FIG. 14B schematically illustrates another implementation of the housing 202 in a battery cooling/heating system. As shown, the coolant may be circulated through the housing 202 as well as through a second housing that surrounds another battery 810. The battery 810 may include a high voltage battery system. It is noted that the components may be arranged in any order and are not limited to the configuration illustrated in FIG. 14B.

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

The methods disclosed herein comprise one or more steps or actions for achieving the described method. The method steps and/or actions may be interchanged with one another without departing from the scope of any claims. In other words, unless a specific order of steps or actions is specified, the order and/or use of specific steps and/or actions may be modified without departing from the scope of any claims.

It is to be understood that the implementations are not limited to the precise configuration and components illustrated above. Various modifications, changes, and variations may be made in the arrangement, operation, and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

Electric Vehicle High Voltage Battery Limit Optimization

Typically, with electric vehicles, battery discharge capacity limits are published and associated vehicle systems should keep their consumption below the limits. The battery discharge capacity often must be split among different systems so that each system has a portion of the limits to use.

The devices, systems, and methods disclosed herein have several features, no single one of which is solely responsible for its desirable attributes. Without limiting the scope, its more prominent features will now be discussed briefly. After considering this discussion, one will understand how the features of the system and methods provide several advantages over traditional systems and methods.

One aspect relates to an electric vehicle power management system comprising a first battery system electrically connected to an electric motor of the electric vehicle and at least one additional vehicle system; a second battery system electrically connected to at least one system of the electric vehicle operating at a lower voltage than the electric motor; a DC-DC converter electrically coupled between the first and second battery systems and configured to transfer power at least from the first battery system to the second battery system; and a controller in communication with the first battery, the second battery, and the DC-DC converter, the controller configured to receive a request from a user to draw power from the first battery system, calculate a first energy requirement for one of the electric motor and the at least one additional vehicle system based on the request, identify a discharge rate limit of the first battery system, determine user priority of acceleration provided by the electric motor relative to a function of the at least one additional vehicle system; calculate, based at least partly on the user priority, the discharge rate limit, and the first energy requirement, a first portion of the discharge rate limit to discharge to the electric motor and a second portion of the discharge rate limit to discharge to the at least one additional vehicle system, and control discharge of the first battery system so that the first portion is discharged to the electric motor and the second portion is discharged to the at least one additional vehicle system.

Another aspect relates to a method of managing an electric vehicle power system comprising, by a battery system controller comprising one or more processors receiving an energy draw request from a user of a acceleration using an electric motor, a primary battery system of the electric vehicle configured to provide power to the electric motor and to at least one additional vehicle system; determining an energy requirement of the acceleration; identifying a discharge limit of the battery system; determining a user priority of the acceleration relative to a function of the at least one additional vehicle system; calculating, based at least partly on the user priority, the discharge rate limit, and the energy requirement, a first portion of the discharge rate limit to discharge to the electric motor and a second portion of the discharge rate limit to discharge to the at least one additional vehicle system; and controlling discharge of the first battery system so that the first portion is discharged to the electric motor and the second portion is discharged to the at least one additional vehicle system.

Typical electric vehicles almost exclusively draw their power from one high capacity, high voltage battery system. The high capacity, high voltage battery system is used to power the motors that propel the vehicle and is stepped down with one or more DC-DC converters to power other electrically powered systems. When the high capacity, high voltage battery system is not engaged, for example, when the vehicle is parked, a lower capacity, lower voltage battery may be relied upon. This second battery may function as a typical automobile battery and may be used to start the vehicle and power other components such as, for example, the windows, door locks, and stereo when the high capacity, high voltage battery is disengaged. The second battery is typically recharged by the high capacity, high voltage battery when the vehicle is driving and held at a set charge level, a process known as "floating" the second or auxiliary battery.

An electric vehicle as disclosed can have at least two separate high capacity energy storage systems. The first battery system may be configured to power the vehicle's powertrain and other high-voltage systems such as the battery HVAC and cabin HVAC, as well as providing power to the second battery system via a DC-DC converter. Further, the first battery system can be configured to provide power to its associated systems in a manner that optimizes the user's priorities for power allocation by using the dynamic battery discharge control techniques described in more detail below. The second battery system may be configured to power other components of the vehicle. In some aspects, the first battery system is a high voltage battery system and the second battery system is a low-voltage battery system. Both battery systems may have a relatively high charge storage capacity. That is to say, both battery systems may store large amounts of energy. For example, in one example the high-voltage battery system can be a bank of a number of 400V batteries and the low-voltage battery system can be a large 12V battery and a small 12V battery coupled in parallel. In other examples the low-voltage battery system may be a single large 12V battery. In this way, the performance of the vehicle can be improved as will be explained below.

According to the present disclosure, a controller can be provided to monitor current discharge limits of the high voltage battery and allocate portions of the limits to various vehicle systems in a manner that optimizes user experience. In contrast, in conventional systems such limits are often split in a predefined manner amongst different systems so that HVAC, the DC-DC, powertrain, and other systems are each given a portion of the limits for their own use. This can result in a sub-optimal user experience in certain situations in which the user's demands on the high voltage battery exceed its limits. For example, when a user is running cabin and battery HVAC to de-ice the vehicle, the powertrain typically receives a smaller portion of the battery limits than if the HVAC systems were not running. Accordingly, from the perspective of the driver it can seem as if the vehicle has less acceleration capabilities than it does when the HVAC is not also consuming power. Accordingly, existing solutions trade the ability of the car to perform de-icing and vehicle performance. When the high voltage battery has limited performance due to cold temperatures these tradeoffs become even more apparent to the driver.

One example existing solution is to have only the powertrain receive the battery limits and, if too much power is consumed, the battery decreases the limits and the powertrain will take less power. This solution tends to overdischarge the battery. Another example existing solution is to carve out a minimum power for the HVAC system so that the cabin windshield HVAC system can operate effectively in de-icing times, and any remaining power is given to the powertrain. This solution does not consider driver power and the expectation of the driver to achieve a certain rate of acceleration in the vehicle. Accordingly, the existing solutions may not allow the powertrain as much power as it could have under optimal conditions because they are reserving power for other systems, may temporarily give too much power to the powertrain resulting in the high voltage batteries decreasing their limits thus leaving even less power for acceleration, and may provide initially high acceleration to the driver only to clamp down mid-acceleration as the battery limits react to the high usage.

The above-described problems, among others, are addressed in some embodiments by the battery management systems of the present disclosure, in which a controller can be provided to monitor current discharge limits of the high voltage battery and allocate portions of the limits to various vehicle systems in a manner that optimizes user experience. Driver intentions regarding power allocation priorities can be predicted based on a number of factors, and the controller can shift the portions of the battery limits allocated to the associated systems to meet the vehicle performance expectations of the driver.

In some embodiments, driver intentions regarding acceleration can be predicted based on accelerator pedal position, rate of change of accelerator pedal position, current speed, user preferences for "sport" type modes versus "eco" type modes of vehicle operation, actual mode selection (if available), historical driver data regarding acceleration patterns, and the like. The controller can use these factors to identify conditions in which the driver is predicted to prioritize acceleration above other vehicle functions for example for one or two seconds for acceleration in a passing condition (that is, speeding up to pass another vehicle while driving) or for five to eight seconds for acceleration from a stop.

If the controller determines that conditions exist satisfying a condition in which the driver has a priority for vehicle acceleration, the controller can temporarily divert up to 100% of the high voltage battery limits to the powertrain. In such circumstances, if the user was already operating the vehicle HVAC, the fan may be left running to continue the user's perception that the HVAC system is running even though the heating or cooling capabilities are temporarily not powered. In some embodiments, the low voltage battery can be used to operate the HVAC fan systems in order to provide maximum available power from the high voltage battery to the drivetrain. Some embodiments may implement a handshake method to identify which systems besides the powertrain are already drawing power from the high voltage battery when acceleration is initiated and, if such systems are not already drawing power, may require such systems to wait until acceleration is completed to begin drawing power if the vehicle user initiates such systems during acceleration. Accordingly, if the driver desires more power to the powertrain than would be possible if HVAC and other AC systems are using their power allotment, the allotment prioritization will be changed to allow more power to the powertrain and less power to the other systems.

Most of the time the powertrain does not require all of the available power so the other systems will have all the power needed to fulfill their functions. When the driver does (or will soon) need all of the available power to accelerate, some or all of the other systems can be required to quickly ramp down their consumption, freeing all or substantially all of the power for the powertrain. The powertrain can have information about the power available at that moment as well as power that will be made available soon from other systems ramping down, and can use the power so that the driver experiences consistent acceleration.

In some embodiments the controller can determine that the driver prioritizes other systems besides acceleration and can accordingly provide those systems with their full requirement for power. For example, if the controller receives data from a temperature sensor in the vehicle cabin indicating that the cabin temperature is below freezing, the controller can determine based on the sensor data and optionally also on historical data that the driver prioritizes cabin HVAC until the cabin reaches a particular temperature. The same can be applied to other extreme temperature situations. Similarly, if the controller receives data from a temperature sensor associated with one or more of the vehicle batteries indicating that the battery temperature is outside of a predetermined optimal operation range, the controller may allocate some or all of the required power to the battery HVAC system to warm or cool the battery or batteries to within the predetermined optimal operation range. As another example, if the controller has information indicating that the primary user of the vehicle is a passenger with a hired driver, then the controller may determine that the primary user does not prioritize rapid acceleration, instead preferring a more smooth ride.

Some implementations can use a power limit handshake with other vehicle systems besides the system identified as the driver priority. To illustrate, returning to the example in which the controller has identified acceleration as a driver priority, when the driver initiates acceleration the controller can issue power allotments to the HVAC systems and DC-DC based on their current usage. The power allotments may be (1) greater than the current usage, allowing such systems to ramp up their power if needed; (2) less than the current usage, requiring such systems to ramp down their power; or (3) equal to the current usage, allowing such systems to continue using the same or less power than what is currently being used. These non-priority systems may also request more or less power than their power allotment during the time frame in which acceleration is prioritized, and this may or may not result in the controller changing the power limits. Power limit changes may be determined based on an updated assessment of driver preferences in some examples.

In some embodiments, multiple levels of driver priorities for power allocation can be identified, and available battery limits for some or all systems powered by the high voltage battery can be set based on the levels of driver priorities for such systems.

Some examples can use a combination of instantaneous current limits and short term average current limits to dynamically allocate power to the systems associated with the high voltage battery. For example, the controller can publish an instantaneous limit to the powertrain, HVAC systems, and DC-DC, as these are the primary power consumers from the high voltage battery. The instantaneous limits convey what the battery could provide for a period of less than one second. However, the controller can also publish information about what could be used for different periods of time, for example two seconds, three seconds, or longer. Based on the combination of the predicted driver power priorities and the different power limits, the controller can ensure consistent performance of the powertrain and other systems during the acceleration time.

According to the battery management techniques of the present disclosure, "optimum performance" from the perspective of the driver's predicted intentions can be achieved by temporarily diverting up to 100% of the power and energy to the systems as they need it, and by tuning the power consumption so that it is maximized over the desired time period and is not clamped down mid-acceleration due to overconsumption. Thus, the presently disclosed techniques can provide for maximum battery life by avoiding over-discharge that is typical in high-performing electric vehicles. For example, typical electric vehicles cannot prevent turning on HVAC loads while the battery is at its power limit providing full acceleration, resulting in over-discharge of the battery until the response time of the control system. Over-discharge can reduce battery life as well as create safety concerns.

The high voltage battery system may be configured to power the vehicle components that require relatively high voltages. For example, the high voltage battery system may be configured to power one or more electric motors that are used to propel the vehicle (referred to herein as the "powertrain"), HVAC systems for controlling temperature of the high voltage battery system, and vehicle cabin HVAC. The high voltage battery system may include a number of high voltage batteries. The low voltage battery system may be configured to power the vehicle components that require relatively low voltages in comparison to the high voltage battery system. For example, the low voltage battery system may be configured to power the windows, the locks, the doors, the entertainment systems, infotainment systems, wireless modems, routers, and the like. Low voltage systems or components may generally refer to systems or components that require less voltage than the motors that propel the vehicle. Power can be transferred in a unidirectional or bidirectional manner between the high voltage battery system and the low voltage battery system via a DC-DC converter.

A vehicle with at least two separate high capacity energy storage systems can have several advantages. For one, the low voltage system can power vehicle systems for long periods of time without engaging the high voltage battery system, minimizing the portion of the limits required by the DC-DC in the techniques described herein. Energy is lost when electric power is moved between battery systems. For example, DC-DC converters are not perfectly efficient and energy is lost when a DC-DC converter is operated. Thus, if the low voltage system has sufficient storage capabilities, it can be used to power systems other that the propulsion motors for longer periods of time and the need to recharge the low voltage system, and/or draw power from the high voltage system, may be reduced or eliminated.

In some implementations, the electric vehicle is configured such that both the high voltage battery system and a low-voltage battery system run in a power depletion mode for at least a portion of a trip. This reduces the need for re-charging of the low-voltage battery system by the high voltage battery system and reduces energy lost through a DC-DC converter. The effective battery life of both of the battery systems may be increased by two high capacity systems. That is to say, having two high capacity batteries reduces and/or eliminates the need to transfer power from the high voltage system to the low voltage system (and vice versa) reduces battery cycling (recharging) and increases the effective life of the battery systems.

The following description is directed to certain implementations for the purpose of describing the innovative aspects of this disclosure. However, a person having ordinary skill in the art will readily recognize that the teachings herein can be applied in a multitude of different ways. For example, the dynamic power allocation techniques, though described primarily in terms of systems drawing power from a high voltage battery, can also be applied to systems drawing power from a low voltage battery of a vehicle.

As used herein, the term "electric vehicle" can refer to any vehicle that is partly or entirely operated based on stored electric power, such as a pure electric vehicle, plug-in hybrid electric vehicle, or the like. Such vehicles can include, for example, road vehicles (cars, trucks, motorcycles, buses, etc.), rail vehicles, underwater vessels, electric aircraft, and electric spacecraft.

In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Figure 15:
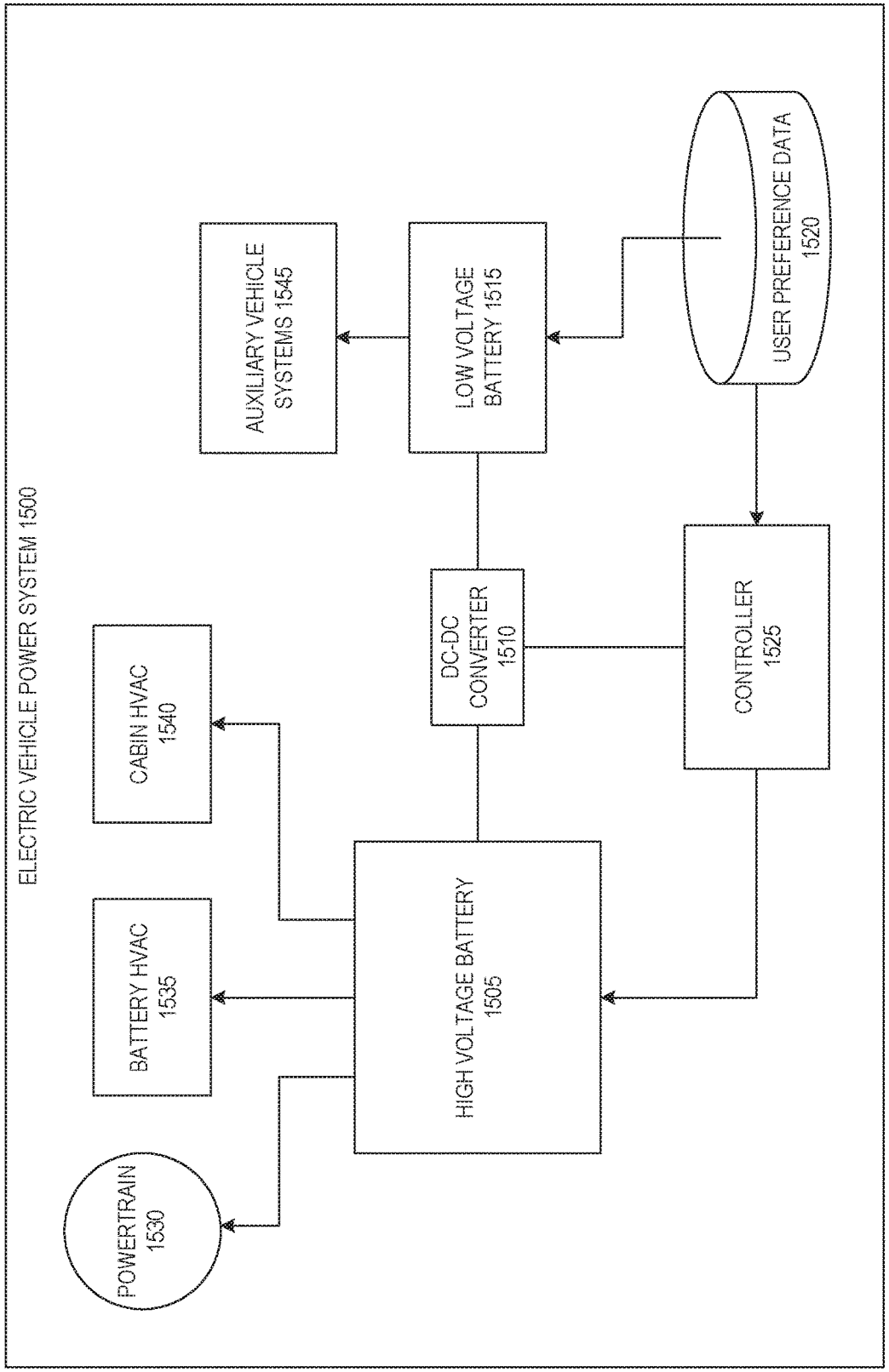
FIG. 15 illustrates a schematic block diagram of an example electric vehicle power system.

FIG. 15 depicts a schematic block diagram of an example electric vehicle power system 1500.

As depicted in FIG. 15, some embodiments of the electric vehicle power system 1500 include two battery systems 1505 and 1515 connected by a DC-DC converter 1510. A first battery system may be a high voltage battery system 1505, which can comprise one or more high voltage batteries, for example, strings of 400V batteries in one embodiment. A second battery system may be a low voltage battery system 1515. In some implementations, the low voltage battery system may be a single battery. In some implementations, the low voltage battery can be one or more low voltage batteries, for example, a large low voltage battery and optionally a small low voltage battery coupled in parallel. The large and small low voltage batteries can be 12V batteries in some examples. The DC-DC converter 1510 can transfer power in a unidirectional or a bidirectional manner between the two battery systems 1505 and 1515.

The high voltage battery 1505 may be configured to power the vehicle systems that require relatively high voltages, for example, the powertrain 1530, HVAC systems for controlling the temperature of the high voltage battery system 1535, and the vehicle cabin HVAC 1540. The powertrain 1530 may comprise one or more electric motors that are used to propel the vehicle. In addition, the high voltage battery 1505 can provide power to the low voltage battery 1515 via the DC-DC converter 1510. The low voltage battery 1515 may be configured to power the vehicle systems that require relatively low voltages in comparison to those powered by the high voltage battery 1505, for example, the auxiliary vehicle systems 1545. The auxiliary vehicle systems may comprise the windows, locks, doors, entertainment systems, infotainment systems, fans, lights, cameras, sensors, wireless modems, routers, and the like.

A controller 1525 may monitor current discharge limits of the high voltage battery 1505 and allocate portions of the limits to various vehicle systems, for example, the powertrain 1530, battery HVAC 1535, cabin HVAC 1540, DC-DC converter 1510, and low voltage battery 1515, as illustrated in FIG. 15. Such limits may be stored in a database, such as the user preference database 1520, and accessed by the controller 1525. The controller 1525 can allocate portions of the limits in a manner that optimizes user experience and meets a user's expectations. Factors that are used to predict a user's expectations regarding power allocation priorities can be stored in the user preference database 1520. In some implementations, the user preference database 1520 can communicate with the controller 1525 and the low voltage battery 1515, as shown in FIG. 15. In some implementations, the user preference database 1520 can communicate with one or more of the controller 125, the high voltage battery 1505, powertrain 1530, battery HVAC 1535, cabin HVAC 1540, DC-DC converter 1510, low voltage battery 1515, and auxiliary vehicle systems 1545. The controller 1525 can use one or more of the factors stored in the user preference database 1520 to identify conditions in which the user is predicted to prioritize certain vehicle systems over others. If the controller 1525 determines that certain conditions exist, then the controller 1525 can signal the high voltage battery 1505 and/or the low voltage battery 1515 to change the power allocation to the various vehicle systems.

The user preference database 1520 can store information on accelerator pedal position, rate of change of accelerator pedal position, speed of the vehicle, user preferences for "sport" type mode versus "eco" type modes of vehicle operation, actual mode selection (if available), historical driver data regarding acceleration patterns, driver profile, speed limits, traffic, cabin temperature, environmental conditions, as well as information representing the charge capacities and thresholds associated with the high voltage battery system 1505 and the low voltage battery system 1515. Vehicle operation modes can be an indicator of a driver's priorities. For example, a selection of a "sport" type mode may indicate a driver prefers power, acceleration, and/or tighter handling. A selection of an "eco" type mode may indicate a driver prefers to optimize battery life and fuel efficiency. A driver profile can include information regarding historical driver routes, speeds, acceleration patterns, and the like, as well as historical data regarding driver usage of auxiliary vehicle systems including seat warmers, cabin HVAC, infotainment systems, and the like. Environmental conditions can include temperature, wind, rain, and other weather conditions that affect driving speeds, create delays, or otherwise impact vehicle operation and/or battery performance.

The controller 1525 can include a plurality of passive and/or active circuit elements, signal processing components, such as analog-to-digital converters (ADCs), amplifiers, buffers, drivers, regulators, or other suitable components. The controller 1525 can also include one or more processors, microprocessors, or logic circuits to process incoming data to generate outputs, such as the battery discharge signals and charge transfer signals for transferring power between the high voltage battery system 1505 and the low voltage battery system 1515 as described herein. In some embodiments, the controller 1525 can also include one or more components for communicating and sending and receiving data within the electric vehicle power system 1500 and/or with other components or circuitries in the electric vehicle. For example, the various components and circuits within the system 1500, including components in the controller 1525 can be in communication with one another using protocols or interfaces such as a CAN bus, SPI, or other suitable interfaces. And in some embodiments, the processing of incoming data can be at least in part performed by other components not in the controller 1525 within the electric vehicle as the controller 1525 communicates with other components.

Reference may be made throughout the specification to a "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as "low voltage" systems. Some vehicles may use two or more 12 volt batteries to provide higher voltages. Thus, it will be clear that the systems and methods described herein may be utilized with battery arrangements in at least the range of 4-34 volts without departing from the spirit or scope of the systems and methods disclosed herein.

In some aspects, the second high capacity battery system is added to an existing electric vehicle. For example, the second high capacity battery system can be provided as an add-on package or kit for increasing the capacity of the low voltage battery systems that already exist.

The battery systems disclosed herein may include a plurality of electrochemical cells. The cells may be connected in series and/or in parallel. The cells may be divided into multiple portions or strings. The batteries and/or strings of batteries may be connected to or isolated from other vehicle circuitry by one or more magnetic contactors. Normally open contactors may require a power supply in order to enter or remain in the closed circuit position. Such contactors may be configured to be in the open (disconnected) configuration when powered off to allow the batteries and/or strings of batteries to remain disconnected while the vehicle is powered off. Thus, on startup, a small power input may be required to close at least one contactor of the batteries, battery packs, and/or strings of batteries. Once a contactor is closed, the batteries may supply the power required to keep the contactor(s) closed and/or supply power to other vehicle systems.

Figure 16:
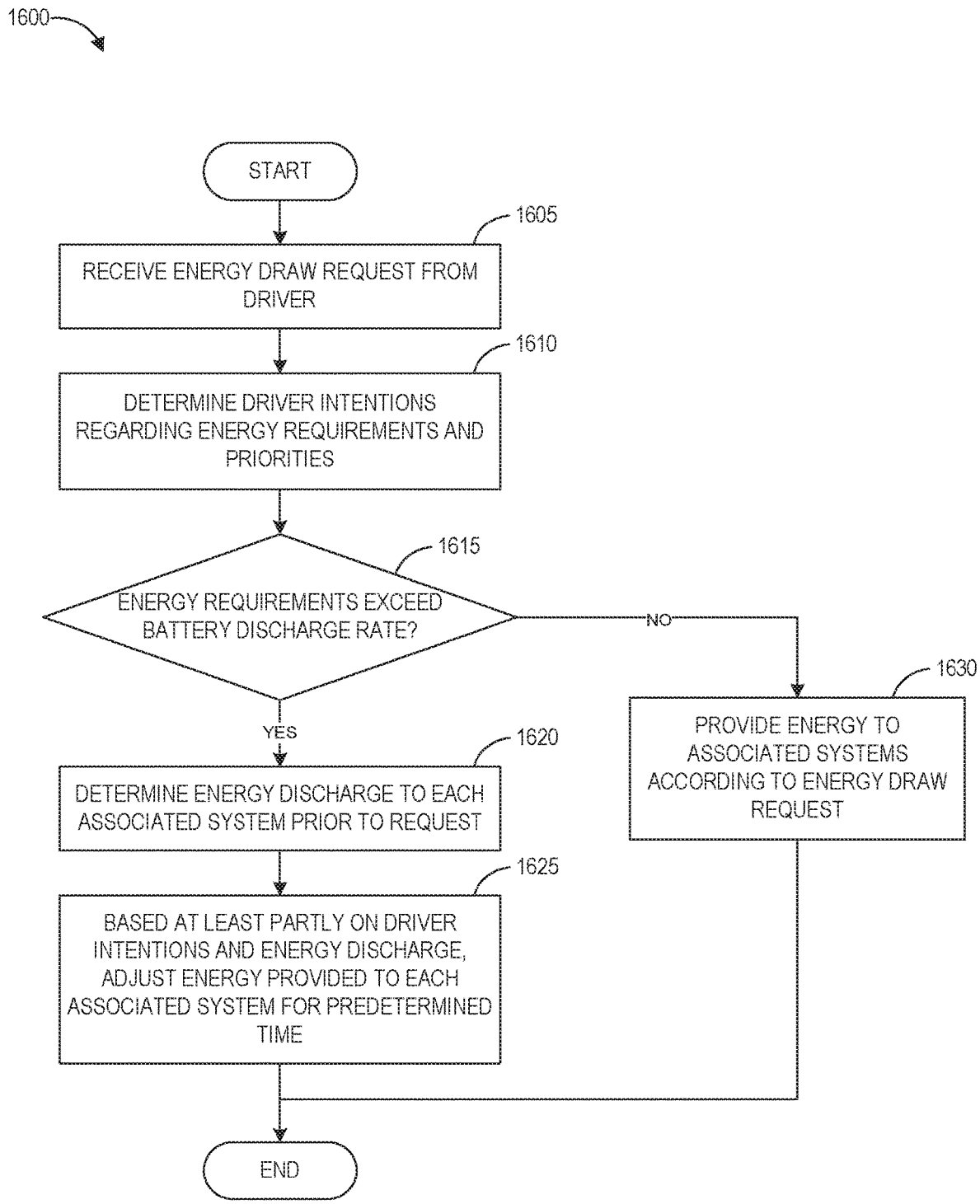
FIG. 16 illustrates a flow diagram of an example process for dynamically allocating portions of battery discharge to associated systems to optimize user experience.

FIG. 16 illustrates a flow diagram of an example process 1600 for dynamically allocating portions of battery discharge to associated systems to optimize user experience. The process 1600 can be implemented by the controller 1525 in some examples.

At block 1605, the controller 1525 can receive an energy draw request from the driver. The energy draw request could be related to any of the vehicle systems. For example, the driver may request energy for the powertrain by pressing on the accelerator pedal or increasing the target speed of the cruise control. The driver may request energy for the cabin HVAC by turning on or up the A/C, heat, or defroster in the vehicle cabin.

At block 1610, the controller 1525 determines driver intentions regarding the energy requirements and power allocation priorities. Driver intentions may include, for example, an amount of energy required by an associated system to perform the request an estimated time to perform the request. Driver intentions can be predicted based on one or more factors, including, for example, accelerator pedal position, rate of change of accelerator pedal position, current speed, user preferences for "sport" type mode versus "eco" type modes of vehicle operation, actual mode selection, historical driver data regarding acceleration patterns, cameras, sensors, information on speed limits, cabin temperature, and the like. For example, if the cabin temperature is below freezing and the driver activates the defroster, the driver intentions may be to use the cabin HVAC 1540 to defrost the windows for one to two minutes. For example, if the current speed is zero miles per hour and the driver presses on the accelerator pedal, the driver intentions may be to use the powertrain 1530 to accelerate from zero to seventy miles per hour ("mph") without any loss of power. This may require four to five seconds of power. However, if the current speed is 65 mph, the driver intentions may be to use the powertrain 1530 to accelerate to 80 mph to pass a vehicle, which may require one to two seconds of power. A selection of an "eco" type mode may indicate driver intentions that prioritize optimization of battery life. A selection of a "sport" type mode may indicate driver intentions that prioritize power and acceleration.

At decision block 1615, the controller 1525 determines whether the energy requirements of an associated system exceed the battery discharge limit set for that associated system. The battery discharge rate limits can be stored in user preference database 1520 of FIG. 15 in some embodiments. Over-discharge of a battery, or discharging more than the battery discharge rate limit, can reduce battery life and present safety concerns. If it is determined that the energy requirements do not exceed the battery discharge rate limit, the process moves to block 1630 and the controller 1525 signals the high voltage battery system 1505 and/or the low voltage battery system 1515 to provide energy to the associated systems according to the energy draw requested at block 1605. If the energy draw request will not result in an over-discharging of the battery, then the controller 1525 can safely signal the battery to provide the requested energy to the associated systems. For example, if the energy draw request was for the cabin HVAC 1540, then the controller 1525 may signal the high voltage battery 1505 to provide energy to the cabin HVAC 1540 without exceeding the discharge rate limit of the high voltage battery 1505. After block 1630, the process 1600 terminates.

If it is determined that the energy requirements exceed the battery discharge rate limit, the process 1600 moves to block 1620. At block 1620, the controller 1525 determines the energy discharge of the battery to each associated system prior to the energy draw request at block 1605. In some implementations, the battery may be the high voltage battery 1505 and the associated systems may include, for example, the powertrain 1530, battery HVAC 1535, cabin HVAC 1540, DC-DC converter 1510, and low voltage battery 1505, as shown in FIG. 15. In some implementations, the battery may be the low voltage battery 1515 and the associated systems may include, for example, the auxiliary vehicle systems 1545, DC-DC converter 1510, and high voltage battery 1505.

At block 1625, based at least partly on driver intentions and energy discharge, the controller 1525 signals the high voltage battery system 1505 and/or the low voltage battery system 1515 to adjust the energy provided to each associated system for a predetermined time. For example, the driver may request acceleration and the driver intentions indicate that the driver is currently driving 65 mph with an intent to pass a vehicle and priority of acceleration. The controller 1525 may signal the high voltage battery 1505 to transfer 100% of the power to the powertrain 1530 and stop transfer to the battery HVAC 1535, cabin HVAC 1540, and DC-DC converter 1510 for one to two seconds. The controller 1525 may optionally signal the low voltage battery system 1515 to transfer power to the auxiliary vehicle systems 1545, for example the fans of the cabin HVAC 1540, for one to two seconds or another predetermined time, such as four to five seconds. This may optimize the use of power, avoid over-discharging the battery, and allow the driver to experience consistent acceleration. For example, the driver may request the use of the cabin HVAC 1540 and the driver intentions indicate that the vehicle is currently parked with a cabin temperature below freezing. The controller 1525 may signal the high voltage battery 1505 to transfer 100% of the power to the cabin HVAC and stop transfer to the motor 1530, battery HVAC 1535, and DC-DC converter 1510 for one to two minutes. This may optimize the use of power, avoid over-discharging the battery, and allow the driver to defrost the windows efficiently. After block 1625, the process 1600 terminates.

The steps of process 1600 as depicted are illustrative, and need not be performed in the order described.

Figure 17:
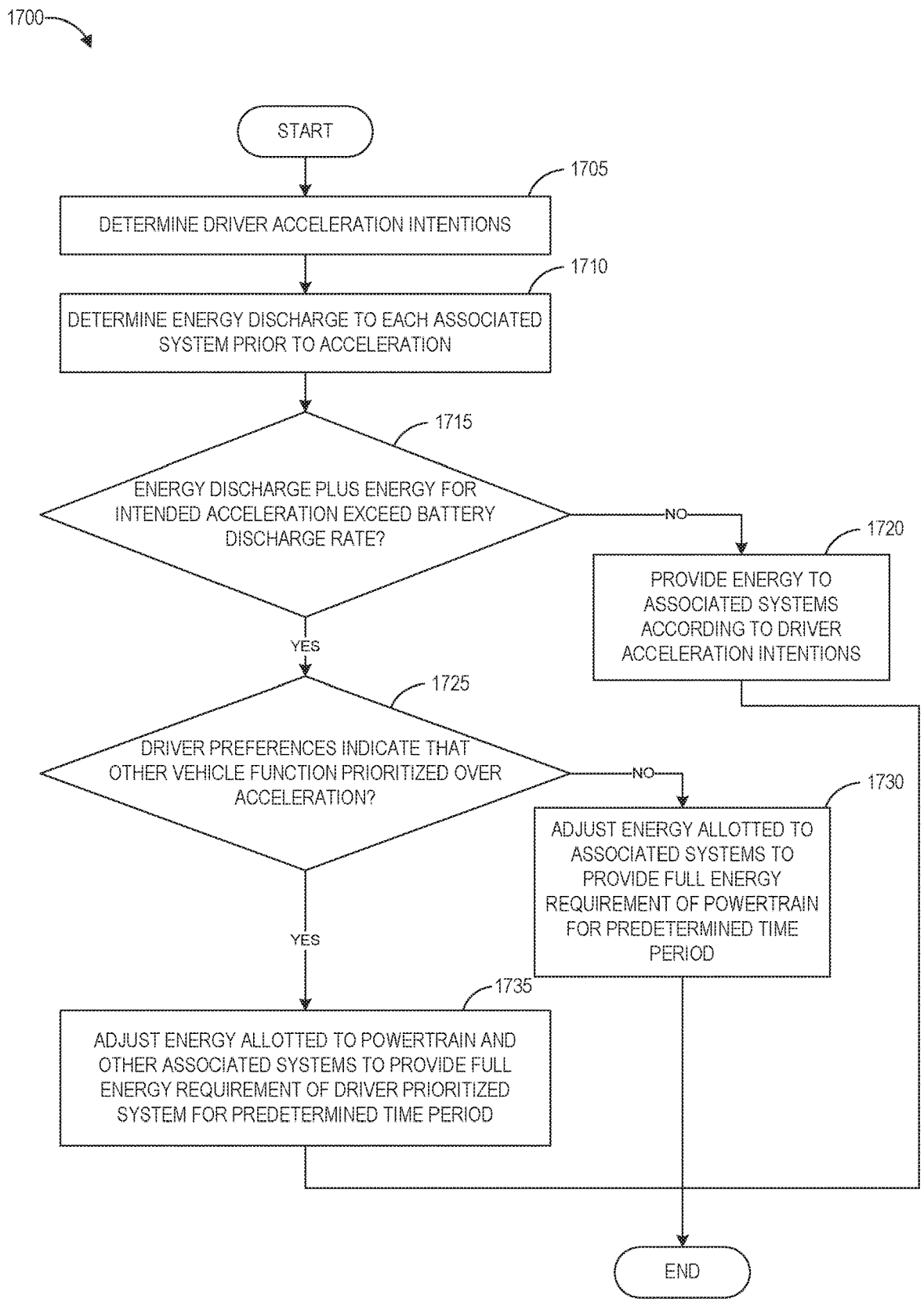
FIG. 17 illustrates a flow diagram of another example process for dynamically allocating portions of battery discharge to associated systems to optimize user experience.

FIG. 17 illustrates a flow diagram of another example process 1700 for dynamically allocating portions of battery discharge to associated systems to optimize user experience. The process 1700 can be implemented by the controller 1525 in some examples.

At block 1705, the controller 1525 can determine the driver acceleration intentions. Driver acceleration intentions may include, for example, energy requirements for the intended acceleration and an estimated time period of the intended acceleration. Driver acceleration intentions can be determined based on accelerator pedal position, rate of change of accelerator pedal position, current speed, user preferences for "sport" type mode versus "eco" type modes of vehicle operation, actual mode selection, historical driver data regarding acceleration patterns, cameras, sensors, information on speed limits, cabin temperature, and the like. For example, if the current speed is zero mph and the driver presses on the accelerator pedal, the driver may intend to use the powertrain 1530 to accelerate from zero to seventy mph without any loss of power. This may require four to five seconds of power. However, if the current speed is 65 mph, the driver may intend to use the powertrain 1530 to accelerate to 80 mph to pass a vehicle, which may require one to two seconds of power.

At block 1710, the controller 1525 determines the energy discharge to each associated system prior to acceleration. For example, the controller 1525 can determine the energy discharge from the high voltage battery 1505 to each of the powertrain 1530, battery HVAC 1535, cabin HVAC 1540, and DC-DC converter 1510, as shown in FIG. 15.

At decision block 1715, the controller 1525 determines whether the energy discharge to the associated systems prior to acceleration plus the energy for the intended acceleration exceed the battery discharge rate limit. The battery discharge rate limit may be stored in a database, for example user preference database 1520 shown in FIG. 15. Discharging a battery over the discharge rate limit may reduce the battery life and present safety concerns. If the energy discharge to the associated systems plus the energy for intended acceleration does not exceed the battery discharge rate limit, the process 1700 moves to block 1720 and the controller 1525 signals the high voltage system 1505 and/or the low voltage system 1515 to provide energy to associated systems according to the driver acceleration intentions. For example, the controller 1525 can signal the high voltage battery 1505 to increase the energy discharge to the powertrain 1530. After block 1720, the process 1700 terminates.

If the energy discharge to the associated systems plus the energy for intended acceleration exceeds the battery discharge rate limit, the process 1700 advances to decision block 1725 and the controller 1525 determines whether the driver preferences indicate that other vehicle functions are prioritized over acceleration. For example, a selection of an "eco" type mode may indicate that battery life efficiency is prioritized over acceleration. A selection of a "sport" type mode or no selection of a vehicle operation mode may indicate that other vehicle functions are not prioritized over acceleration.

If it is determined that other vehicle functions are not prioritized over acceleration, the process continues to block 1730 and adjusts the energy allotted to the associated systems to provide the full energy requirement of the powertrain for a predetermined time. For example, driver intentions may indicate that the driver is currently driving 0 mph with an intent to increase speed to 70 mph and a priority of acceleration. The controller 1525 may signal the high voltage battery 1505 to transfer 90%-100% of the power to the powertrain 1530 and stop transfer to the battery HVAC 1535, cabin HVAC 1540, and DC-DC converter 1510 for four to five seconds. When the other systems quickly ramp down their consumption, it frees all of the available power and energy for the powertrain 1530. Tuning the power consumption so that it is maximized over the predetermined time may prevent a loss of acceleration partially through the acceleration due to overconsumption. This may optimize the use of power, avoid over-discharging the battery, and allow the driver to experience consistent acceleration. The controller may optionally signal the low voltage battery system 1515 to transfer power to the auxiliary vehicle systems 1545, for example the fans of the cabin HVAC 1540, for four to five seconds or another predetermined time. This may allow the driver to not notice the adjustment to power usage from the cabin HVAC 1540 to the powertrain 1530 since the fans in the cabin are working. After block 1735, the process 1700 terminates.

If it is determined that other vehicle functions are prioritized over acceleration, the process 1700 continues to block 1735 and the controller adjusts the energy allotted to the powertrain and other associated systems to provide the full energy requirement of the user prioritized system for a predetermined time. For example, if the driver preferences indicate that cabin HVAC 1540 is prioritized over acceleration, the cabin HVAC 1540 may be allotted to receive its full energy requirement, which may be 30% of the discharge rate limit, for four to five seconds. The controller 1525 may signal the high voltage battery 1505 to stop transfer to the battery HVAC 1535 and the DC-DC converter 1510. The controller 1525 may signal the high voltage battery 1505 to transfer 70% of the power to the motor 1530. After block 1735, the process 1700 terminates.

The steps of process 1700 as depicted are illustrative, and need not be performed in the order described.

Implementations disclosed herein provide systems, methods and apparatus for optimized operation of an electric vehicle power system having two high-capacity battery banks. One skilled in the art will recognize that these embodiments may be implemented in hardware or a combination of hardware and software or firmware.

The systems and methods above have been described in general terms as an aid to understanding details of preferred embodiments of the present invention. Other preferred embodiments of the present include the described application for electric vehicles. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The battery limit allocation processes and functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-readable medium" refers to a computing device or hardware processor in combination with code or instructions (e.g., a "program") that may be executed, processed or computed by the computing device or processor. As used herein, the terms "code" or "instructions" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least partly on."

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and features disclosed herein.

Electric Vehicle Dual-Battery System Charge Management

Electric vehicles, hybrid vehicles, and internal combustion engine vehicles generally contain a battery to provide power for starting the vehicle and/or to provide power for various other electrically powered systems when the engine and/or high voltage battery system is not engaged. Automotive batteries typically provide approximately 12 volts, and may range up to 16 volts. Such batteries are typically lead-acid batteries.

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

One aspect relates to an electric vehicle power system comprising a first battery system electrically connected to at least an electric motor of the electric vehicle, the first battery system having a first capacity; a second battery system electrically connected to at least one system of the electric vehicle operating at a lower voltage than the electric motor, the second battery system having a second capacity of at least 4% of the first capacity; a DC-DC converter electrically coupled between the first and second battery systems and configured to transfer power at least from the first battery system to the second battery system; a controller in communication with the first battery system, second battery system, and DC-DC converter, the controller configured to calculate a first expected range of the first battery system, calculate a second expected range of the second battery system, and control discharge of the first battery system and second battery system to substantially equalize the first expected range and the second expected range.

Another aspect relates to a method of operating power system of an electric vehicle, the method comprising, by a battery system controller comprising one or more processors generating an estimate of a length of time a user will be operating the electric vehicle; calculating a first power consumption rate for a first battery system configured to provide power to one or more high voltage loads of the electric vehicle; calculating a second power consumption rate for a second battery system configured to provide power to one or more low voltage loads of the electric vehicle; identifying a first depletion threshold for the first battery system and a second depletion threshold for the second battery system; determining a first expected range of the first battery system based at least partly on the length of time and the first power consumption rate, wherein the first battery system is predicted to deplete to the first depletion threshold at the first expected range; determining a second expected range of the first battery system based at least partly on the length of time and the second power consumption rate, wherein the second battery system is predicted to deplete to the second depletion threshold at the second expected range; comparing the first expected range to the second expected range; and controlling discharge of the first battery system and second battery system to substantially equalize the first expected range and the second expected range.

Another aspect relates to a method of charging an electric vehicle power system comprising receiving first and second currents from a charging connection coupled to the electric vehicle power system; providing the first current to a first battery system of the electric vehicle power system; providing the second current to a second battery system of the electric vehicle power system; calculating a first expected time for the first battery system to reach a first threshold capacity; calculating a second expected time for the second battery system to reach a second threshold capacity; and controlling charge transfer between the first battery system and the second battery system via a DC-DC converter, to equalize the first expected time and the second expected time.

Typical electric vehicles almost exclusively draw their power from one high capacity, high voltage battery system. The high capacity, high voltage battery system is used to power the motors that propel the vehicle and is stepped down with one or more DC-DC convertors to power other electrically powered systems. When the high capacity, high voltage battery system is not engaged, for example, when the vehicle is parked, a lower capacity, lower voltage battery may be relied upon. This second battery may function as a typical automobile battery and may be used to start the vehicle and power other components such as, for example, the windows, door locks, and stereo when the high capacity, high voltage battery is disengaged. The second battery is typically recharged by the high capacity, high voltage battery when the vehicle is driving and held at a set charge level, a process known as "floating" the second or auxiliary battery.

An electric vehicle as disclosed can have at least two separate high capacity energy storage systems. The first battery system may be configured to power the vehicle's drivetrain and other high-voltage systems. The second battery system may be configured to power other components of the vehicle. In some aspects, the first battery system is a high voltage battery system and the second battery system is a low-voltage battery system. Both battery systems may have a relatively high charge storage capacity. That is to say, both battery systems may store large amounts of energy. For example, in one example the high-voltage battery system can be a bank of a number of 400V batteries and the low-voltage battery system can be a large 12V battery and a small 12V battery coupled in parallel. In other examples, the low-voltage battery system may be a single large 12V battery. In this way, the performance of the vehicle can be improved as will be explained below.

A controller can be provided to monitor state of charge of both the high and low voltage battery systems and to control charge transfer between the high and low voltage battery systems such that both systems are depleted or predicted to be depleted at substantially the same time. Alternatively, the controller can control usage of the high and low voltage battery systems such that both systems reach, or are predicted to reach, a depletion threshold at substantially the same time. Similarly, the controller may control charging such that both the high and low voltage batteries are fully charged, or reach a desired state of charge, at substantially the same time.

For example, the controller can calculate a number of factors in order to determine whether the high voltage or low voltage battery will be depleted first, and based on this determination can transfer charge between the high and low voltage batteries such that they are predicted to reach set depletion levels at substantially the same time. Accordingly, driving range is maximized based on the set amount of stored power contained in the vehicle's battery systems.

As part of this process, the controller can generate an estimate of high voltage battery use per distance unit (for example, watt hours per mile) and low voltage battery use per time unit (for example, watt hours per minute) based at least on one or more of historical usage data, driver profile, and environmental conditions. A driver profile can include information regarding historical driver routes, speeds, acceleration patterns, and the like, as well as historical data regarding driver usage of auxiliary vehicle systems including seat warmers, cabin HVAC, infotainment systems, and the like. Passenger profiles can similarly be incorporated into the controller calculations. Environmental conditions can include temperature, wind, rain, and other weather conditions that affect driving speeds, create delays, or otherwise impact vehicle operation and/or battery performance. Unlike typical methods for estimating energy used per distance, the disclosed techniques can exclude energy sent from the high voltage battery to the DC-DC from the historical usage data of the high voltage battery, as this energy is commonly used to charge the low voltage battery and thus not used by the vehicle's high voltage systems. Historical data and driver and/or passenger profiles can also be used to estimate how much energy will be consumed from the auxiliary battery when the vehicle is off. Accordingly, the controller can determine an estimated usage for each of the high and low voltage batteries.

The controller can also determine an estimated time that will be spent driving based on traffic, weather conditions, and input or predicted driving routes or destinations. The controller can be configured to communicate with a data store for retrieving some or all information, and real-time data such as weather and traffic conditions may be populated into the data store by the controller or another system from third party services providing such data. It will be appreciated that the estimated time spent driving can be calculated when a drive is initialized and also dynamically recalculated based on changing conditions during driving. Based on the estimated drive time and the estimated usage for each of the high and low voltage batteries, the controller can calculate a predicted distance and margin of error for which each of the high and low voltage batteries is predicted to retain charge. This prediction can account for depletion thresholds of one or both of the high and low voltage battery systems. For example, a minimum capacity can be required for the low voltage battery to support power steering and braking and power emergency flash lights for a mandated time period. Depletion thresholds for the high and/or low voltage battery systems can also account for a minimum state of charge required to preserve cycle life.

Based on the prediction of the driving distances at which each of the high and low voltage batteries is expected to reach its depletion threshold, the controller can identify whether the high or low voltage battery is predicted to reach depletion first. If the high voltage battery will reach depletion first beyond the margin of error, the controller can disable the DC-DC (if unidirectional) so that high voltage power is not transferred to the low voltage battery or any auxiliary systems. If the DC-DC can be run backwards or is bidirectional, the controller can discharge the low voltage battery to provide charge to the high voltage battery. If the low voltage battery will reach depletion first beyond the margin of error, the controller can be run to transfer charge from the high voltage battery to the low voltage battery. If the expected ranges of the high and low voltage battery are equal or within the calculated margin of error, the controller can take no action and maintain the current system usage. The controller can dynamically recalculate the predicted depletion distances and adjust DC-DC usage accordingly to keep the expected range of both batteries equal (or substantially equal, within the calculated margin of error).

The high voltage battery system may be configured to power the vehicle components that require relatively high voltages. For example, the high voltage battery system may be configured to power one or more electric motors that are used to propel the vehicle, HVAC systems for controlling temperature of the high voltage battery system, and vehicle cabin HVAC. The high voltage battery system may include a number of high voltage batteries. The low voltage battery system may be configured to power the vehicle components that require relatively low voltages in comparison to the high voltage battery system. For example, the low voltage battery system may be configured to power the windows, the locks, the doors, the entertainment systems, infotainment systems, wireless modems, routers, and the like. Low voltage systems or components may generally refer to systems or components that require less voltage than the motors that propel the vehicle. Power can be transferred in a unidirectional or bidirectional manner between the high voltage battery system and the low voltage battery system via a DC-DC converter.

A vehicle with at least two separate high capacity energy storage systems can have several advantages. For one, the low voltage system can power vehicle systems for long periods of time without engaging the high voltage battery system. Energy is lost when electric power is moved between battery systems. For example, DC-DC converters are not perfectly efficient and energy is lost when a DC-DC convertor is operated. Thus, if the low voltage system has sufficient storage capabilities, it can be used to power systems other than the propulsion motors for longer periods of time and the need to recharge the low voltage system, and/or draw power from the high voltage system, may be reduced or eliminated.

In some implementations, the electric vehicle is configured such that both the high voltage battery system and a low-voltage battery system run in a power depletion mode for at least a portion of a trip. This reduces the need for re-charging of the low-voltage battery system by the high voltage battery system and reduces energy lost through a DC-DC converter. Typically, when running the DC-DC converter at a very low power relative to its maximum rating, the efficiency of the DC-DC converter is much lower than it would be otherwise. The DC-DC converter may run at an optimum efficiency of 97%.

The effective battery life of both of the battery systems may be increased by two high capacity systems. That is to say, having two high capacity batteries reduces and/or eliminates the need to transfer power from the high voltage system to the low voltage system (and vice versa) reduces battery cycling (recharging) and increases the effective life of the battery systems. In some embodiments, a high voltage battery system may have a capacity of 110 kWh to 120 kWh, and a low voltage high capacity battery system may have a capacity of 5 or more kWh, or 4% or more of the capacity of the high voltage battery.

The battery systems may have charging temperature thresholds, for example, a battery may not be able to be charged when the battery is below a certain temperature. In cases where the battery system falls below the charging temperature threshold, the battery temperature can be raised by engaging the battery HVAC. In some implementations, the electric vehicle is configured such that heating of the battery system is delayed until the margins dictate that the battery system needs to be charged. If the battery is too cold to charge, but is able to provide sufficient energy, then the electric vehicle can delay heating the battery. This would allow the battery to potentially avoid thermal cycling during some shorter drives in moderately cold weather.

The following description is directed to certain implementations for the purpose of describing the innovative aspects of this disclosure. However, a person having ordinary skill in the art will readily recognize that the teachings herein can be applied in a multitude of different ways.

As used herein, the term "electric vehicle" can refer to any vehicle that is partly or entirely operated based on stored electric power, such as a pure electric vehicle, plug-in hybrid electric vehicle, or the like. Such vehicles can include, for example, road vehicles (cars, trucks, motorcycles, buses, etc.), rail vehicles, underwater vessels, electric aircraft, and electric spacecraft.

In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Figure 18:
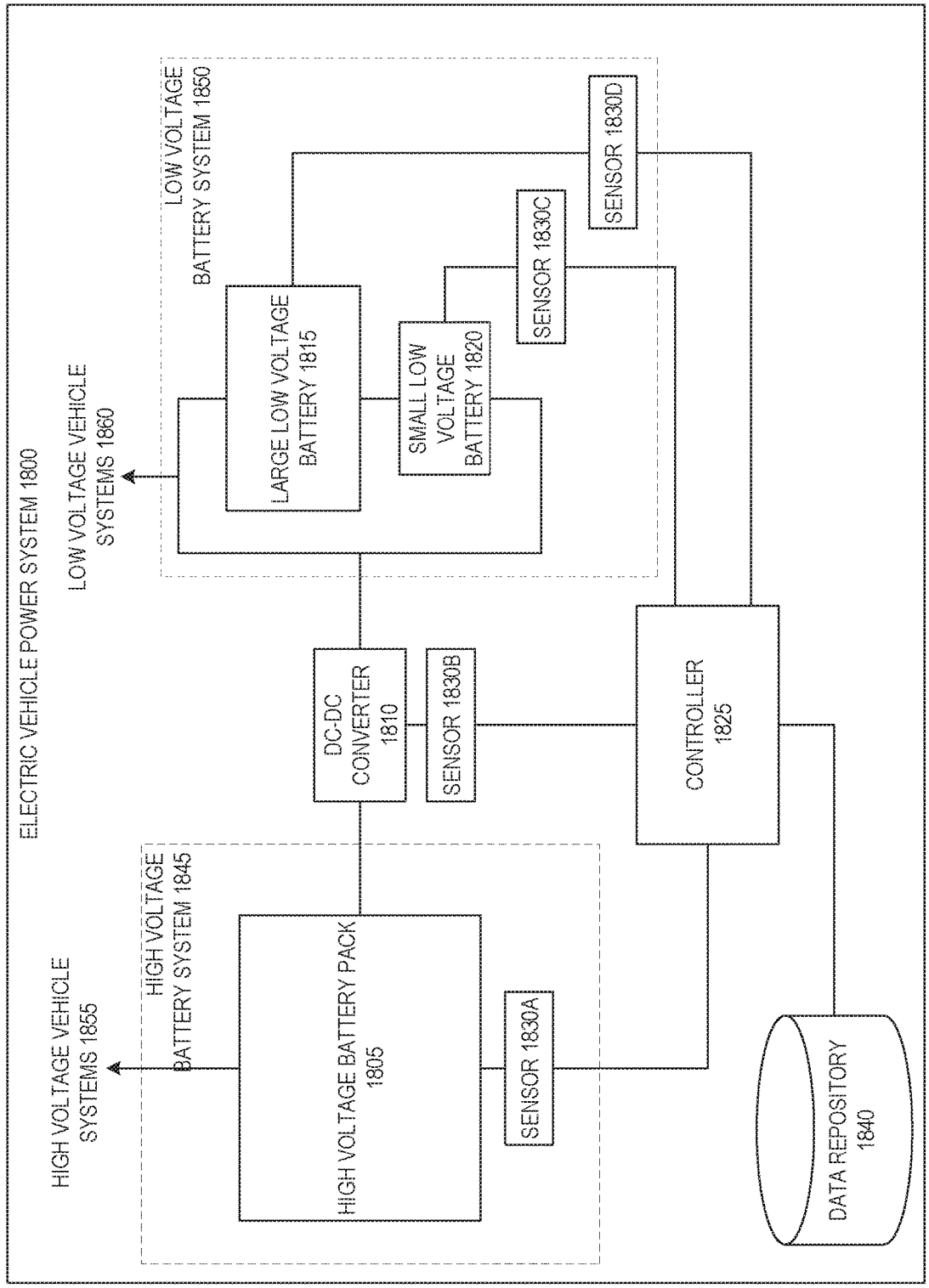
FIG. 18 illustrates a schematic block diagram of an example electric vehicle power system.

FIG. 18 depicts a schematic block diagram of an example electric vehicle power system 1800.

As depicted in FIG. 18, some embodiments of the electric vehicle power system 1800 include two battery systems 1845 and 1850 connected by a DC-DC converter 1810. A first battery system may be a high voltage battery system 1845 that comprises a high voltage battery pack 1805. The high voltage battery pack 1805 can be one or more high voltage batteries, for example strings of 400V batteries in one embodiment. A second battery system may be a low voltage battery system 1850 that comprises a large low voltage battery 1815 and optionally a small low voltage battery 1820 coupled in parallel. The large and small low voltage batteries can be 12V batteries in some examples. The DC-DC converter 1810 can transfer power in a unidirectional or bidirectional manner between the two battery systems 1845 and 1850.

The high voltage battery system 1845 can be connected to and provide power to various vehicle systems 1855. The vehicle systems may include, but are not limited to, the vehicle components that require relatively high voltages. For example, the high voltage battery system 1845 may be configured to power one or more electric motors that are used to propel the vehicle, HVAC systems for controlling temperatures of the battery systems, and vehicle cabin HVAC. In addition, the high voltage battery system 1845 can provide power to the low voltage batteries 1815, 1820 via the DC-DC converter 1810.

The low voltage battery system 1850 can be connected to and provide power to various vehicle systems 1860. The vehicle systems may include, but are not limited to, the vehicle components that require relatively low voltages in comparison to those powered by the high voltage battery system 1845. For example, the low voltage battery system 1850 may be configured to power the windows, the locks, the doors, the entertainment systems, infotainment systems, wireless modems, routers, and the like.

The controller 1825 can monitor and control the state of charge of the high voltage battery pack 1805, large low voltage battery 1815, and small low voltage battery 1820 via data received from sensors 1830A, 1830C, and 1830D, respectively. The controller 1825 can control usage of the high voltage battery system 1855 and the low voltage battery system 1850 such that both systems reach, or are predicted to reach, a depletion threshold at substantially the same time. The depletion threshold of the high voltage battery may be the same or substantially similar to the depletion threshold of the low voltage battery. The depletion thresholds of the high voltage battery and low voltage battery may be unique. Such depletion thresholds may be stored in the data repository 1840 and accessed by controller 1825.

The controller 1825 can generate an estimate of high voltage battery pack 1805 use per distance unit and low voltage battery 1815 and 1820 use per time unit based on data stored in the data repository 1840. The data repository 1840 can include, for example, historical usage data, driver profile, passenger profile, and environmental conditions, as well as information representing the charge capacities and thresholds associated with the high voltage battery system 1855 and the low voltage battery system 1850. A driver profile can include information regarding historical driver routes, speeds, acceleration patterns, and the like, as well as historical data regarding driver usage of auxiliary vehicle systems including seat warmers, cabin HVAC, infotainment systems, and the like. Passenger profiles can include historical data regarding passenger usage of auxiliary vehicle systems including seat warmers, cabin HVAC, infotainment systems, and the like. Environmental conditions can include temperature, wind, rain, and other weather conditions that affect driving speeds, create delays, or otherwise impact vehicle operation and/or battery performance. An estimate of time spent driving can be calculated by the controller 1825 based on one or more of historical usage, traffic, and driver preferences.

The controller 1825 can monitor and control the charge transfer between the high and low voltage battery systems by the DC-DC converter 1810 via data received from sensor 1830B. If the controller 1825 determines, beyond a margin of error, that the high voltage battery pack 1805 will reach depletion first, the controller 1825 can disable a unidirectional DC-DC converter 1810 so that power is not transferred from the high voltage battery pack 1805 to the low voltage batteries 1815 and 1820. If the DC-DC converter can be run backwards or is bidirectional, the controller 1825 can discharge one or both of the low voltage batteries 1815 and 1820 to provide charge to the high voltage battery pack 1805. If the controller 1825 determines, beyond a margin of error, that low voltage batteries 1815 and 1820 will reach depletion first, the controller 1825 can run the DC-DC converter 1810 to transfer charge from the high voltage battery pack 1805 to the low voltage batteries 1815 and 1820.

Controller 1825 can include a plurality of passive and/or active circuit elements, signal processing components, such as analog-to-digital converters (ADCs), amplifiers, buffers, drivers, regulators, or other suitable components. The controller 1825 can also include one or more processors, microprocessors, or logic circuits to process incoming data to generate outputs, such as the battery discharge signals and charge transfer signals for transferring power between the high voltage battery system 1855 and the low voltage battery system 1850 as described herein. In some embodiments, the controller 1825 can also include one or more components for communicating and sending and receiving data within the electric vehicle power system 1800 and/or with other components or circuitries in the electric vehicle. For example, the various components and circuits within the system 1800, including components in the controller 1825 can be in communication with one another using protocols or interfaces such as a CAN bus, SPI, or other suitable interfaces. And in some embodiments, the processing of incoming data can be at least in part performed by other components not in the controller 1825 within the electric vehicle as the controller 1825 communicates with other components.

Reference may be made throughout the specification to a "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as "low voltage" systems. Some vehicles may use two or more 12 volt batteries to provide higher voltages. Thus, it will be clear that the systems and methods described herein may be utilized with battery arrangements in at least the range of 4-34 volts without departing from the spirit or scope of the systems and methods disclosed herein.

In some aspects, the second high capacity battery system is added to an existing electric vehicle. For example, the second high capacity battery system can be provided as an add-on package or kit for increasing the capacity of the low voltage battery systems that already exist.

The battery systems disclosed herein may include a plurality of electrochemical cells. The cells may be connected in series and/or in parallel. The cells may be divided into multiple portions or strings. The batteries and/or strings of batteries may be connected to or isolated from other vehicle circuitry by one or more magnetic contactors. Normally open contactors may require a power supply in order to enter or remain in the closed circuit position. Such contactors may be configured to be in the open (disconnected) configuration when powered off to allow the batteries and/or strings of batteries to remain disconnected while the vehicle is powered off. Thus, on startup, a small power input may be required to close at least one contactor of the batteries, battery packs, and/or strings of batteries. Once a contactor is closed, the batteries may supply the power required to keep the contactor(s) closed and/or supply power to other vehicle systems.

Figure 19:
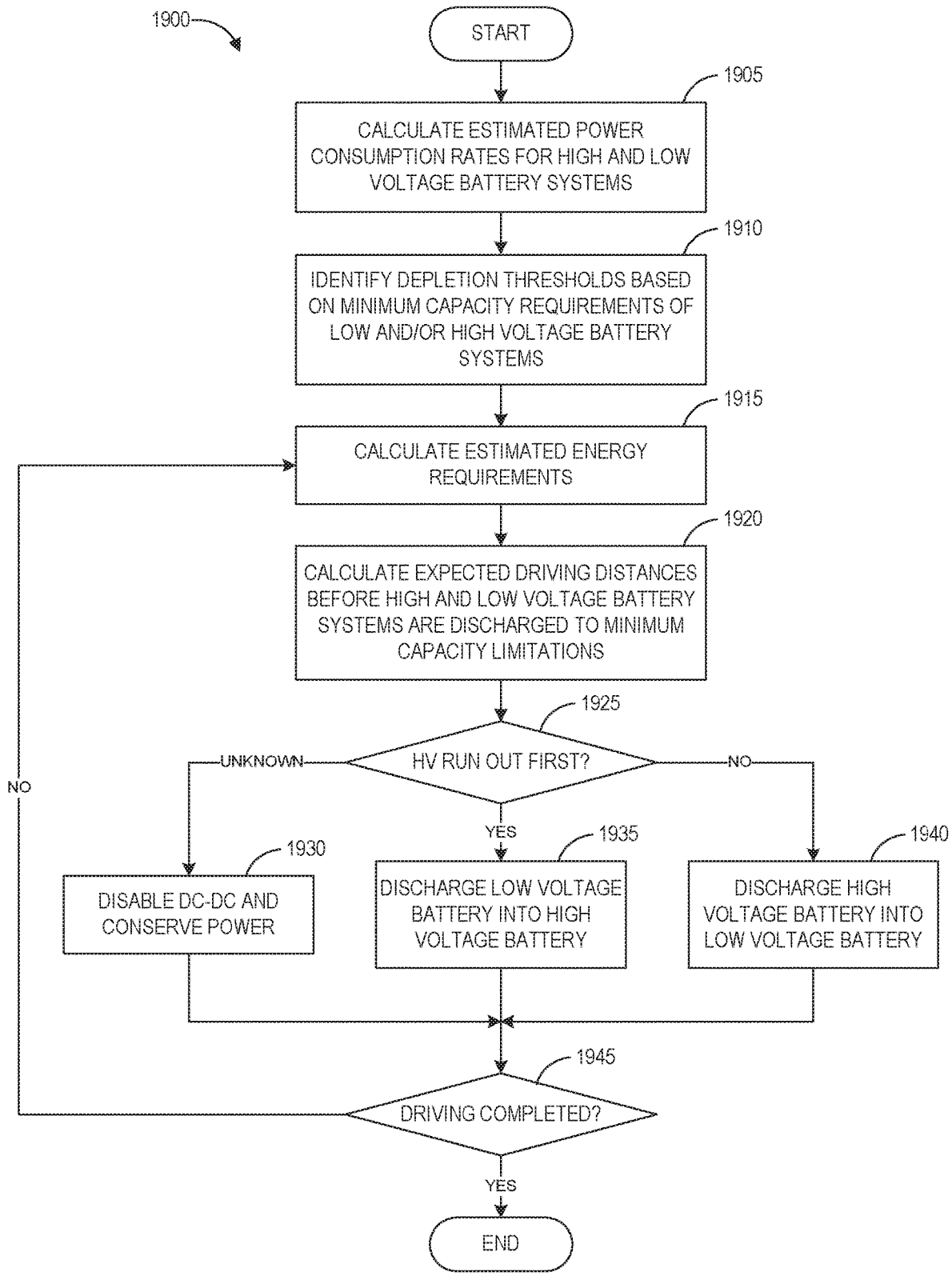
FIG. 19 illustrates a flow diagram of an example process for operating an auxiliary battery in a charge depletion mode to balance usage of high and low voltage batteries.

FIG. 19 depicts a flow diagram of an example process 1900 for operating an auxiliary battery in a charge depletion mode to balance usage of high and low voltage batteries. The process 1900 can be implemented by the controller 1825 in some examples.

At block 1905, the controller 1825 can calculate estimated power consumption rates for the high and low voltage battery systems. At block 1910 the controller 1825 identifies the depletion thresholds of the high and low voltage battery systems based on minimum capacity requirements of the low and/or high voltage battery systems. A minimum capacity may be required in the low voltage battery system for safety or mechanical concerns, for example, to support power steering and braking, to power flashing lights for a mandated time period, and the like. A minimum capacity may be required in the high voltage battery system for safety or mechanical concerns, for example, to power the electric motors for a mandated time period or distance. Some additional capacity may be reserved from the high and/or low voltage battery to ensure that the battery is seldom at low states of charge where its cycle life may be decreased.

At block 1915 the controller 1825 calculates the estimated energy requirements for each of the high and low voltage battery systems. As used herein, energy requirements refers to the expected usage, by all associated systems, of each of the high and low voltage battery systems. In one embodiment, the controller 1825 can calculate the estimated energy requirements by generating an estimate of the time that will be spent driving, for example based on route patterns in driver profile data, GPS coordinates of an input data, traffic and weather conditions, and the like. The controller 1825 can determine an estimate of how much energy will be required from each of the high and low voltage batteries during the estimated time and route that will be driven, for example based on historical vehicle system usage data and/or general vehicle system usage trends, and can use these energy amounts as estimated energy requirements.

At block 1920 the controller 1825 calculates the expected driving distances before the each of the high and low voltage battery systems are discharged to minimum capacity limitations. The process 1900 attempts to keep the range of both battery systems equal or substantially similar, where substantially similar refers to falling within calculated margins of error for the expected ranges of the battery systems.

At decision block 1925 the controller 1825 determines whether the high voltage battery system will be discharged to its minimum capacity threshold first, that is, before the low voltage battery system. It will be appreciated that other embodiments may determine whether the low voltage battery system will be discharged to its minimum capacity threshold first. Further details of one example process for identifying whether the high voltage battery would deplete first is illustrated in FIG. 19. If it is determined that the high voltage battery system will deplete first, the process moves to block 1935 and the controller 1825 generates a signal for the low voltage battery system to discharge into the high voltage battery system. If it is determined that the high voltage battery system will not deplete first, the process moves to block 1940 and the controller 1825 generates a signal for the high voltage battery system to discharge into the low voltage battery system. If it is unknown whether the high voltage battery system will deplete first, for example if the expected ranges of the high and low voltage battery systems are equal or substantially equal within calculated margins of error, the process moves to block 1930 and the controller 1825 generates a signal to disable the DC-DC converter such that power is not transferred between the high and low voltage battery systems. Running the DC-DC converter at very low output power, relative to its maximum rating, may lower its efficiency. Disabling the DC-DC converter may allow the DC-DC converter to run at or near optimum efficiency.

At decision block 1945 the controller 1825 determines whether driving is completed. If driving is completed, the process 1900 terminates. If driving is not completed, the process 1900 loops back to block 1915 and calculates updated estimated energy requirements.

Figure 20:
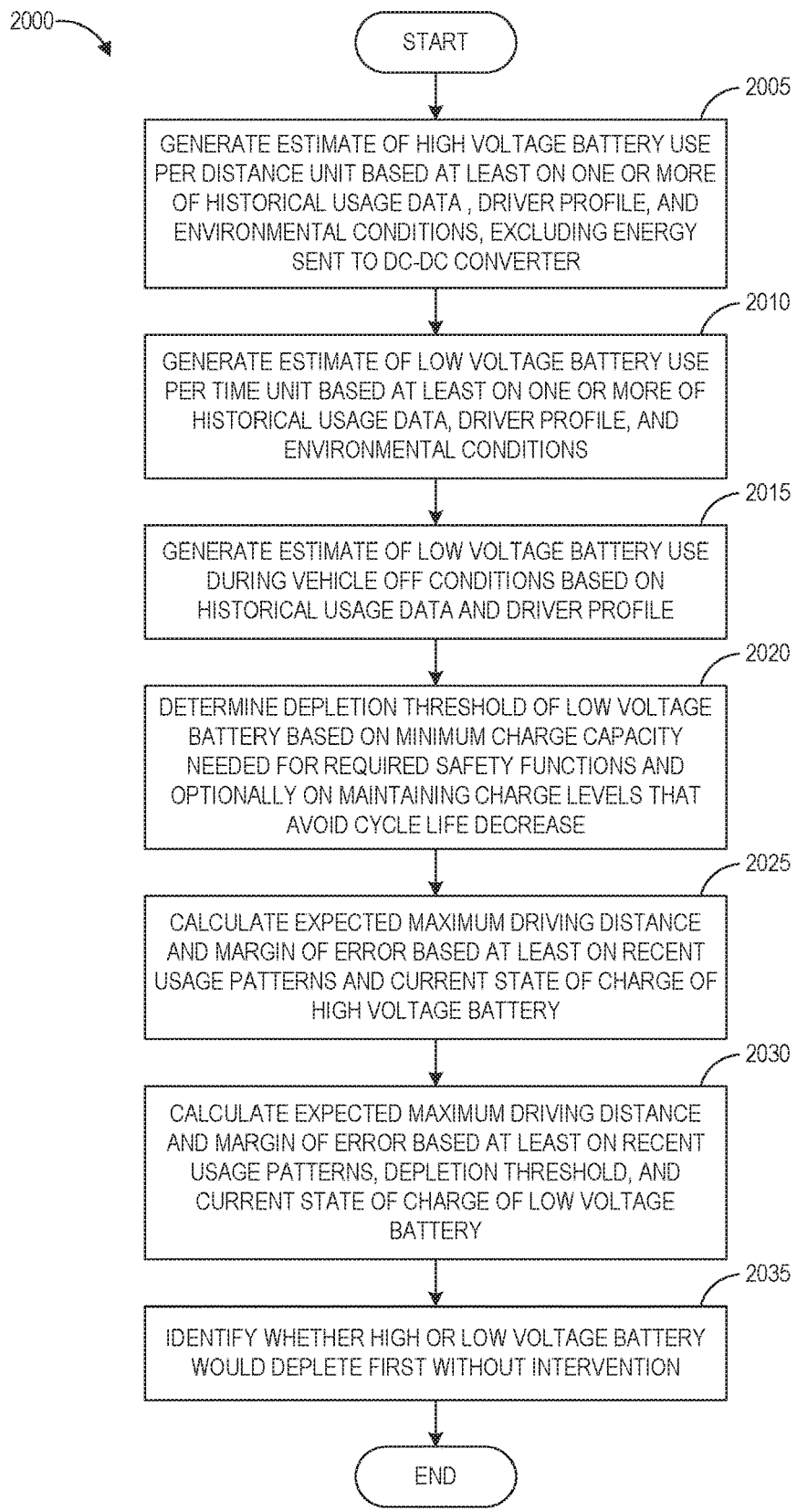
FIG. 20 illustrates a flow diagram of an example process for identifying which of the high and low voltage batteries would deplete first.

FIG. 20 depicts a flow diagram of an example process 2000 for identifying which of the high and low voltage batteries would deplete first. FIG. 20 can be used for blocks 1905-1925 of process 1900 in some embodiments. The process 2000 can be implemented by the controller 1825 in some examples.

At block 2005 the controller 1825 can generate an estimate of high voltage battery use per distance unit based at least on one or more of historical usage data, driver profile, and environmental conditions, excluding energy sent to the DC-DC converter. The energy sent to the DC-DC converter is commonly used to charge the low voltage battery and thus not used by the vehicle's high voltage systems. A driver profile can include aggregated historical information and analysis of such information regarding driver routes, destinations at particular times of the day, week, or month, trends in driver speeds in various conditions and locations, acceleration patterns, and the like. The driver profile can also include historical data regarding driver usage of auxiliary vehicle systems including seat warmers, cabin HVAC, infotainment systems, and the like. Environmental conditions can include temperature, wind, rain, and other weather conditions that affect driving speeds, create delays, or otherwise impact vehicle operation and/or battery performance. The historical usage data, energy sent to the DC-DC converter, driver profile, and environmental conditions may be stored, for example, in a data repository 1840 depicted in FIG. 18.

At block 2010 the controller 1825 generates an estimate of low voltage battery use per time unit based at least on one or more of historical usage data, driver profile, and environmental conditions. The estimate may also be based on passenger profile data and other factors. The estimate excludes energy received from the DC-DC converter so that an estimate of how quickly the low voltage battery system will be discharged if not supported from the high voltage battery system can be generated. The historical usage data, driver profile, and environmental conditions may be stored, for example, in a data repository 1840 depicted in FIG. 18. An estimate of time spent driving may also be generated based on traffic, driver preferences, and historical usage data.

At block 2015 the controller 1825 generates an estimate of low voltage battery use when the vehicle is off based on historical usage data and driver profile. The estimate may also be based on passenger profile data and other factors. The historical usage data and driver profile may be stored, for example, in a data repository 1840 depicted in FIG. 18.

At block 2020 the controller 1825 determines a depletion threshold of the low voltage battery based on minimum charge capacity needed for required safety functions and optionally on maintaining charge levels that avoid cycle life decrease. A minimum amount of capacity is always needed in the low voltage battery system to support power steering and braking as needed to pull the vehicle over from high speeds. A minimum amount of capacity may also be needed to power flashing lights for a mandated time period. This threshold can be stored in data repository 1840 of FIG. 18 in some embodiments.

At block 2025 the controller 1825 calculates the expected maximum driving distance and margin of error based at least on recent usage patterns and current state of charge of the high voltage battery. The process 2000 advances to block 2030 and calculates the expected maximum driving distance and margin of error based at least on recent usage patterns, depletion threshold, and current state of charge of the low voltage battery.

At block 2035 the controller 1825 identifies whether the high or low voltage battery would deplete first without intervention. After identifying whether a battery would deplete first without intervention as depicted in block 2035, the process 2000 terminates.

The steps of process 2000 as depicted are illustrative, and need not be performed in the order described. For example, step 2025 may be performed prior to steps 2010, 2015, and/or 2020.

Figure 21:
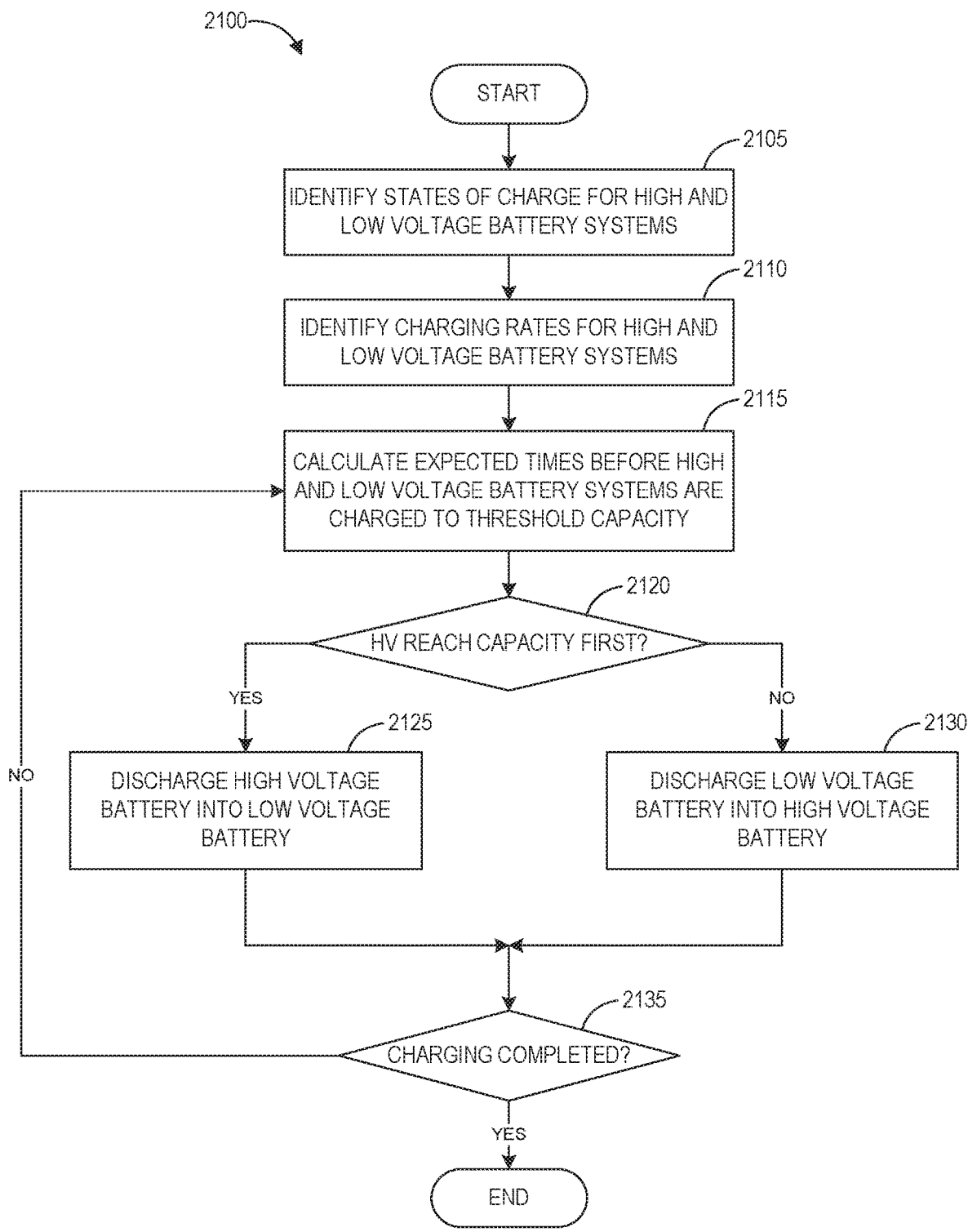
FIG. 21 illustrates a flow diagram of an example process for balanced charging of high and low voltage batteries.

FIG. 21 depicts a flow diagram of an example process 2100 for balanced charging of high and low voltage batteries. The process 2100 can be implemented by the controller 1825 in some examples.

At block 2105 the controller 1825 identifies the states of charge for the high and low voltage battery systems. The units of the state of charge are percentage points, such that 0% corresponds to empty and 100% corresponds to full. At block 2110 the controller 1825 identifies the charging rates for the high and low voltage battery systems.

At block 2115 the controller 1825 calculates the expected times before the high and low voltage battery systems are charged to threshold capacity. The threshold capacity may be at or near 100% state of charge, or can be 75% state of charge or above in other examples.

At decision block 2120 the controller 1825 determines whether the high voltage battery system would reach threshold capacity before low voltage battery system. If it is determined that the high voltage battery would reach capacity first, then the process 2100 moves to block 2125 and the controller 1825 generates a signal to discharge the high voltage battery into the low voltage battery. If it is determined that the high voltage battery would not reach capacity first, then the process 2100 moves to block 2130 and the controller 1825 generates a signal to discharge the low voltage battery into the high voltage battery. In some implementations, if it is unknown whether the high voltage battery would reach capacity first, then the current charging levels would be maintained and the process would move to decision block 2135.

At decision block state 2135 the controller 1825 determines whether charging is completed. If it is determined that charging is completed, then the process 2100 terminates. If charging is not complete, then the process 2100 moves to block 2115 and the controller 1825 calculates the expected times before the high and low voltage battery systems are charged to threshold capacity.

The steps of process 2100 as depicted are illustrative, and need not be performed in the order described. For example, step 2110 may be performed prior to step 2105.

Figure 22:
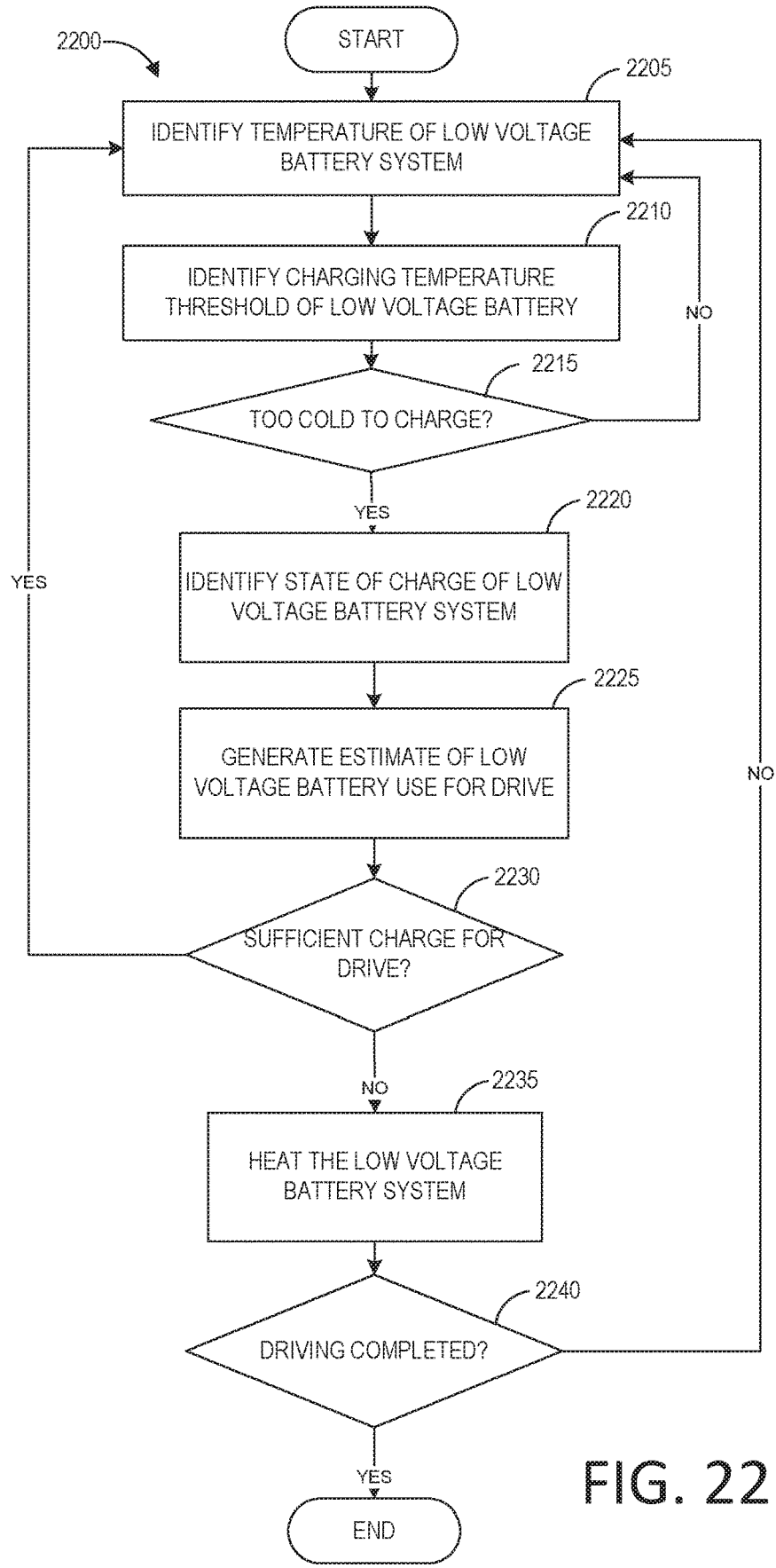
FIG. 22 illustrates a flow diagram of an example process for determining whether to thermal cycle the low voltage battery.

FIG. 22 depicts a flow diagram of an example process for determining whether to thermal cycle the low voltage battery. The process 2200 can be implemented by the controller 1825 in some examples. The process 2200 can be implemented to avoid thermal cycling during relatively shorter drives in moderately cold weather. Though discussed in terms of the low voltage battery system, process 2200 can be applied similarly to the high voltage battery system in other implementations, for example in systems in which a bi-directional DC-DC can be used to charge the high voltage battery using the low voltage battery when needed.

At block 2205 the controller 1825 identifies the temperature of the low voltage battery system. At block 2210 the controller 1825 identifies the charging temperature threshold of the low voltage battery system. A battery may not be able to be charged when the battery is below a certain temperature.

At decision block 2215 the controller 1825 determines whether the battery is too cold to charge. If the battery is not too cold to charge, the process 2200 moves to block 2205 and the controller 1825 identifies the temperature of the low voltage battery system. If the battery is too cold to charge, the process continues to block 2220 and the controller 1825 identifies the state of charge of the low voltage battery system.

At block 2225 the controller 1825 generates an estimate of low voltage battery use for the drive. The estimate may be based on an estimate of the remaining time in the drive and based on usage patterns of the low voltage battery. The controller 1825 can make such determinations based on one or more of input destination location, historical usage data, driver profile data, passenger profile data, traffic conditions, and environmental conditions. Such data may be stored, for example, in a data repository 1840 depicted in FIG. 18. Real-time data such as weather and traffic conditions may be accessed via third party services providing such data.

At decision block 2230 the controller 1825 determines whether there is a sufficient charge in the low voltage battery to power associated systems for the predicted remaining time in the drive. If there is sufficient charge, the process 2200 loops back to block 2205 and the controller 1825 identifies the temperature of the low voltage battery system. The controller 1825 may loop through the process 2200 continuously or after passage of predetermined time periods. This would allow the vehicle to delay heating the low voltage battery until the margins dictate that it needs to be charged. This may avoid thermal cycling during some shorter drives in moderately cold weather. If there is not sufficient charge, the process moves to block 2235 and heats the low voltage battery system. After heating the low voltage battery system, the process 2200 terminates.

Implementations disclosed herein provide systems, methods and apparatus for efficient operation of an electric vehicle power system having two high-capacity battery banks. One skilled in the art will recognize that these embodiments may be implemented in hardware or a combination of hardware and software or firmware.

The systems and methods above have been described in general terms as an aid to understanding details of preferred embodiments of the present invention. Other preferred embodiments of the present include the described application for electric vehicles. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The battery charging and depletion control processes and functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-readable medium" refers to a computing device or hardware processor in combination with code or instructions (e.g., a "program") that may be executed, processed or computed by the computing device or processor. As used herein, the terms "code" or "instructions" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least partly on."

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and features disclosed herein.

What is claimed is:

1. An electric vehicle comprising:
    a first battery;
    at least one electric motor capable of propelling the vehicle, the motor powered by the first battery in a charge depleting manner;
    a second battery physically separate from the first battery; and
    an HVAC system, the HVAC system configured to be powered by the second battery in a charge depleting manner while the first battery is powering the motor.

2. The electric vehicle of claim 1, wherein the first battery and the second battery are coupled through at least one DC-DC convertor.

3. The electric vehicle of claim 1, wherein the second battery has a terminal voltage that is less than a terminal voltage of the first battery.

4. The electric vehicle of claim 1, wherein the second battery has a capacity of at least three kilowatt hours.

5. The electric vehicle of claim 1, wherein the second battery has a capacity of at least five kilowatt hours.

6. The electric vehicle of claim 1, wherein the second battery has a capacity of at least ten kilowatt hours.

7. The electric vehicle of claim 2, wherein the first battery is capable of charging the second battery through the at least one DC-DC convertor.

8. The electric vehicle of claim 2, wherein the second battery is capable of charging the first battery through the at least one DC-DC convertor.

9. The electric vehicle of claim 2, wherein the DC-DC convertor does not operate during at least some time periods when the first battery is powering the motor.

10. The electric vehicle of claim 1, further comprising a charge port, the charge port capable of electrically coupling to a charging station, the charge port having a direct electrical connection with the first battery and a direct electrical connection with the second battery.

11. A method of powering an electric vehicle while the vehicle is traveling, the method comprising:
    discharging a first battery system by drawing current from the first battery system to power one or more motor loads; and
    simultaneously discharging a second battery system by drawing current from the second battery system to power one or more non-motor loads, the second battery system being electrically isolated from the first battery system.

12. The method of claim 11, wherein current from the first battery system is not recharging the second battery system.

13. The method of claim 11, wherein the second battery system has a terminal voltage that is less than the terminal voltage of the first battery system.

14. The method of claim 11, wherein discharging the second battery system includes discharging the second battery system until a terminal voltage of the second battery system is less than 80% of a terminal voltage of the second battery system when the second battery system is in a fully charged state.

15. The method of claim 11, wherein discharging the second battery system includes discharging the second battery system by at least 50% of the energy storage capacity of the second battery system.

16. The method of claim 11, wherein the one or more non-motor loads are selected from the group consisting of cabin HVAC loads, infotainment loads, and external lighting loads.

17. The method of claim 11, wherein the non-motor loads are HVAC unit loads selected from the group consisting of a resistive heater, a fan, and a compressor.

18. A method of charging an electric vehicle having at least two energy stores that are coupled together by a DC-DC convertor, the method comprising:
   receiving current from a charging connection coupled to the electric vehicle;
   routing a first current directly to a first battery; and
   routing a second current directly to a second battery that is physically separated from the first battery, wherein no current is routed through the DC-DC convertor during at least some of the charging process.

19. The method of claim 18, wherein the first battery has a capacity of at least 100 kWh and the second battery has a capacity of at least 3 kWh.

20. The method of claim 18, wherein the first battery has a capacity of at least 120 kWh and the second battery has a capacity of at least 5 kWh.

* * * * *